United States Patent
Grancharov et al.

(10) Patent No.: US 11,948,356 B2
(45) Date of Patent: Apr. 2, 2024

(54) OBJECT LOCATION DETERMINATION IN FRAMES OF A VIDEO STREAM

(71) Applicant: Telefonaktiebolaget LM Ericsson (publ), Stockholm (SE)

(72) Inventors: Volodya Grancharov, Solna (SE); Arvind Thimmakkondu Hariraman, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 393 days.

(21) Appl. No.: 17/295,113

(22) PCT Filed: Nov. 21, 2018

(86) PCT No.: PCT/EP2018/082119
§ 371 (c)(1),
(2) Date: May 19, 2021

(87) PCT Pub. No.: WO2020/104028
PCT Pub. Date: May 28, 2020

(65) Prior Publication Data
US 2022/0004771 A1 Jan. 6, 2022

(51) Int. Cl.
*G06V 20/20* (2022.01)
*G06F 18/214* (2023.01)
(Continued)

(52) U.S. Cl.
CPC ............ *G06V 20/20* (2022.01); *G06F 18/214* (2023.01); *G06F 18/2415* (2023.01);
(Continued)

(58) Field of Classification Search
CPC ........ G06V 20/20; G06V 20/41; G06V 20/46; G06V 10/454; G06V 10/764;
(Continued)

(56) References Cited

U.S. PATENT DOCUMENTS

2013/0129229 A1* 5/2013 Ernst ............... G06F 18/22
382/217
2020/0065976 A1* 2/2020 Han ............... G06V 10/82

OTHER PUBLICATIONS

Nam, H., et al., "Learning Multi-Domain Convolutional Neural Networks for Visual Tracking", 2016 IEEE Conference on Computer Vision and Pattern Recognition (CVPR), IEEE, Jun. 27, 2016, pp. 4293-4302, XP033021615.
(Continued)

*Primary Examiner* — Edward F Urban
*Assistant Examiner* — Wassim Mahrouka
(74) *Attorney, Agent, or Firm* — COATS & BENNETT, PLLC

(57) ABSTRACT

A context-based object classifying model is applied to a set of object location representations (12, 14), derived from an object detection applied to a frame (10) of a video stream, to obtain a context-adapted classification probability for each object location representation (12, 14). Each object location representation (12, 14) defines a region of the frame (10) and each context-adapted classification probability represents a likelihood that the region comprises an object (11, 13). The model is generated based on object location representations from previous frames of the video stream. It is determined whether the region defined by the object location representation (12, 14) comprises an object (11, 13) based on the context-adapted classification probability and a detection probability. The detection probability is derived from the object detection and represents a likelihood that the region defined by the object location representation (12, 14) comprises an object (11, 13).

21 Claims, 13 Drawing Sheets

(51) Int. Cl.
  *G06F 18/2415* (2023.01)
  *G06V 10/44* (2022.01)
  *G06V 10/764* (2022.01)
  *G06V 10/774* (2022.01)
  *G06V 10/82* (2022.01)
  *G06V 20/40* (2022.01)

(52) U.S. Cl.
  CPC .......... *G06V 10/454* (2022.01); *G06V 10/764* (2022.01); *G06V 10/774* (2022.01); *G06V 10/82* (2022.01); *G06V 20/41* (2022.01); *G06V 20/46* (2022.01)

(58) Field of Classification Search
  CPC .... G06V 10/774; G06V 10/82; G06F 18/214; G06F 18/2415; G06F 18/2413
  See application file for complete search history.

(56) References Cited

OTHER PUBLICATIONS

Sun, Z., et al., "Online Model Adaption for UAV Tracking with Convolutional Neural Network", 2018 15th Conference on Computer and Robot Vision (CRV), IEEE, May 8, 2018, pp. 329-336, XP033475121.

Wang, N., et al., "Transferring Rich Feature Hierarchies for Robust Visual Tracking", Jan. 19, 2015, pp. 1-9, Retrieved from the Internet: URL:https://pdfs.semanticscholar.org/e3c4/33ab9608d7329f944552ba1721e277a42d74.pdf [retrieved on Aug. 2, 2019].

Voigtlaender, P., et al., "Online Adaption of Convolutional Neural Networks for Video Object Segmentation", Aug. 1, 2017, pp. 1-16, Retrieved from the Internet: URL:https://arxiv.org/pdf/1706.09364.pdf [retrieved on Aug. 5, 2019].

Ren, S., et al., "Faster R-CNN: Towards Real-Time Object Detection with Region Proposal Networks", IEEE Transactions on Pattern Analysis ad Machine Intelligence, Jan. 1, 2017, pp. 1-9.

Liu, W., et al., "SSD: Single Shot MultiBox Detector", Proceedings of the European Conference on Computer Vision (ECCV), Jan. 1, 2016, pp. 1-15.

Redmon, J., et al., "YOLO9000: Better, Faster, Stronger", 2017 IEEE Conference on Computer Vision and Pattern Recognition (CVPR), Jan. 1, 2017, pp. 6517-6525.

Everingham, M., et al., "The PASCAL Visual Object Classes (VOC) Challenge", International Journal of Computer Vision (2010) 88, Jan. 1, 2010, pp. 303-338.

Deng, J., et al., "ImageNet: A Large-Scale Hierarchical Image Database", 2009 IEEE, Jan. 1, 2009, pp. 248-255.

Tsai, C., et al., "Incremental and Decremental Training for Linear Classification", ACM, Aug. 24, 2014, pp. 1-10.

Liang, N., et al., "A Fast and Accurate Onling Sequential Learning Algorithm for Feedforward Networks", IEEE Transactions on Neural Networks, Nov. 1, 2006, pp. 1411-1423, vol. 17, No. 6.

* cited by examiner

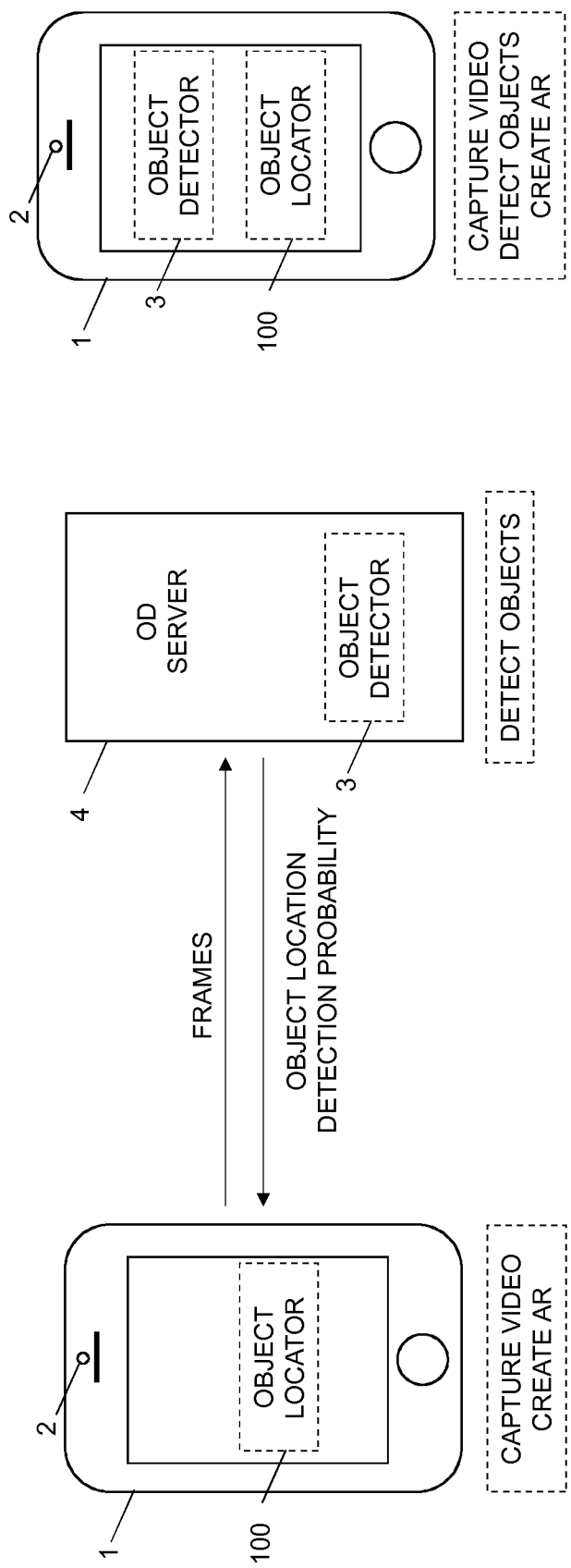

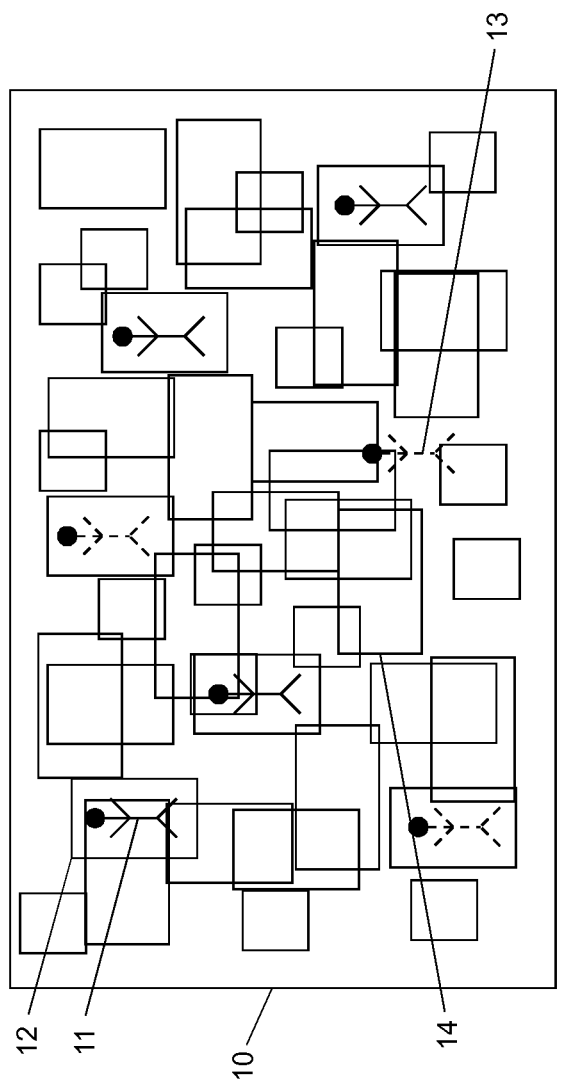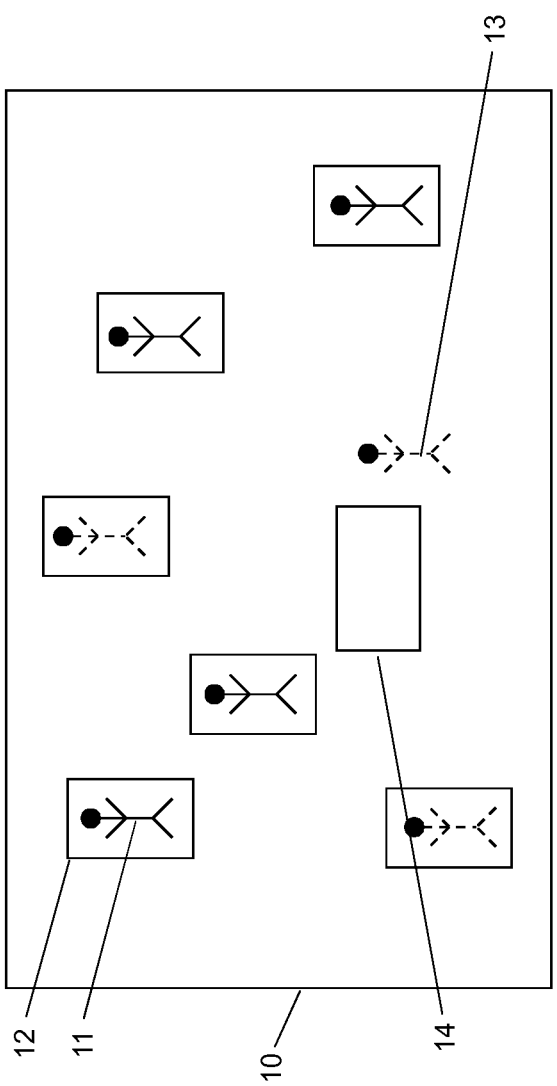

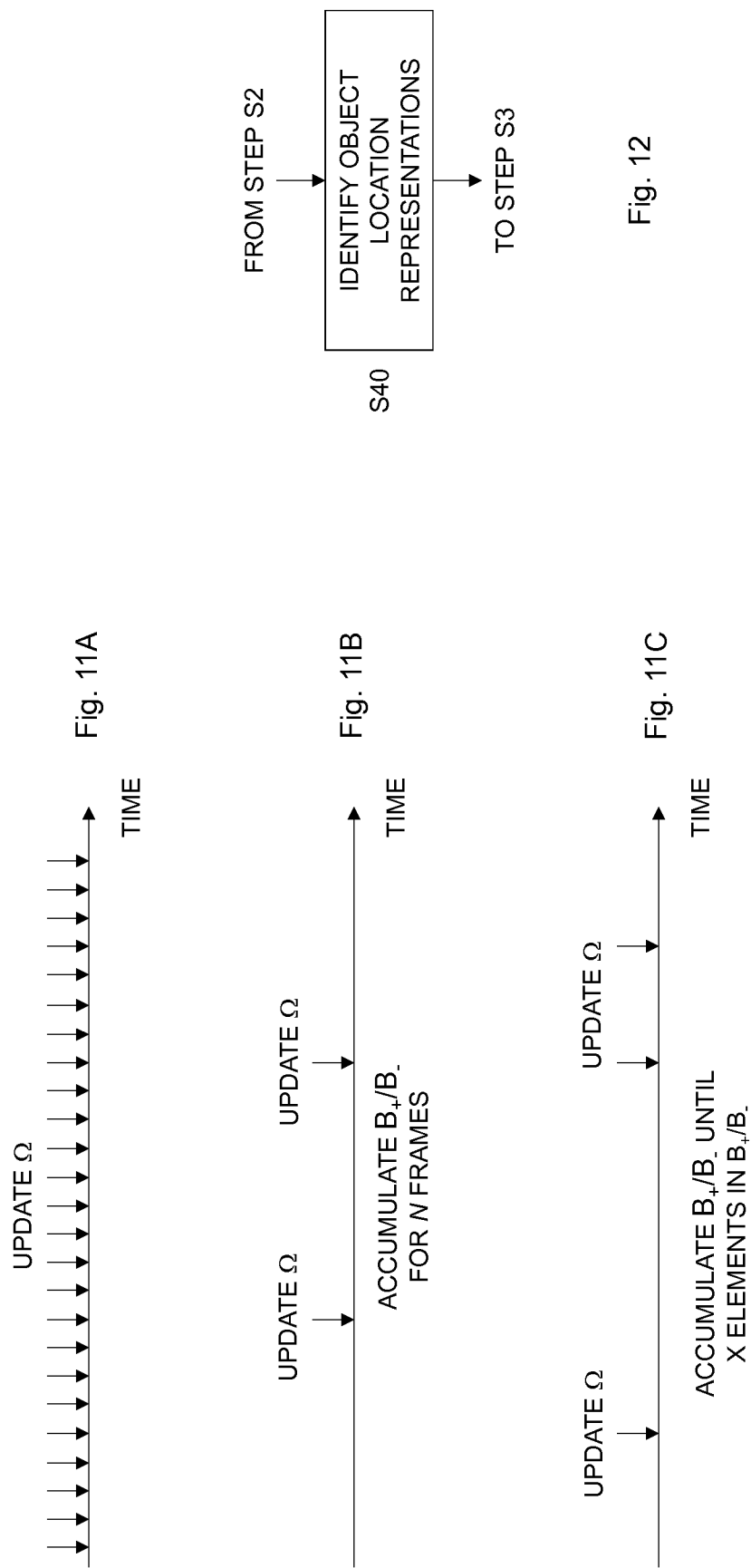

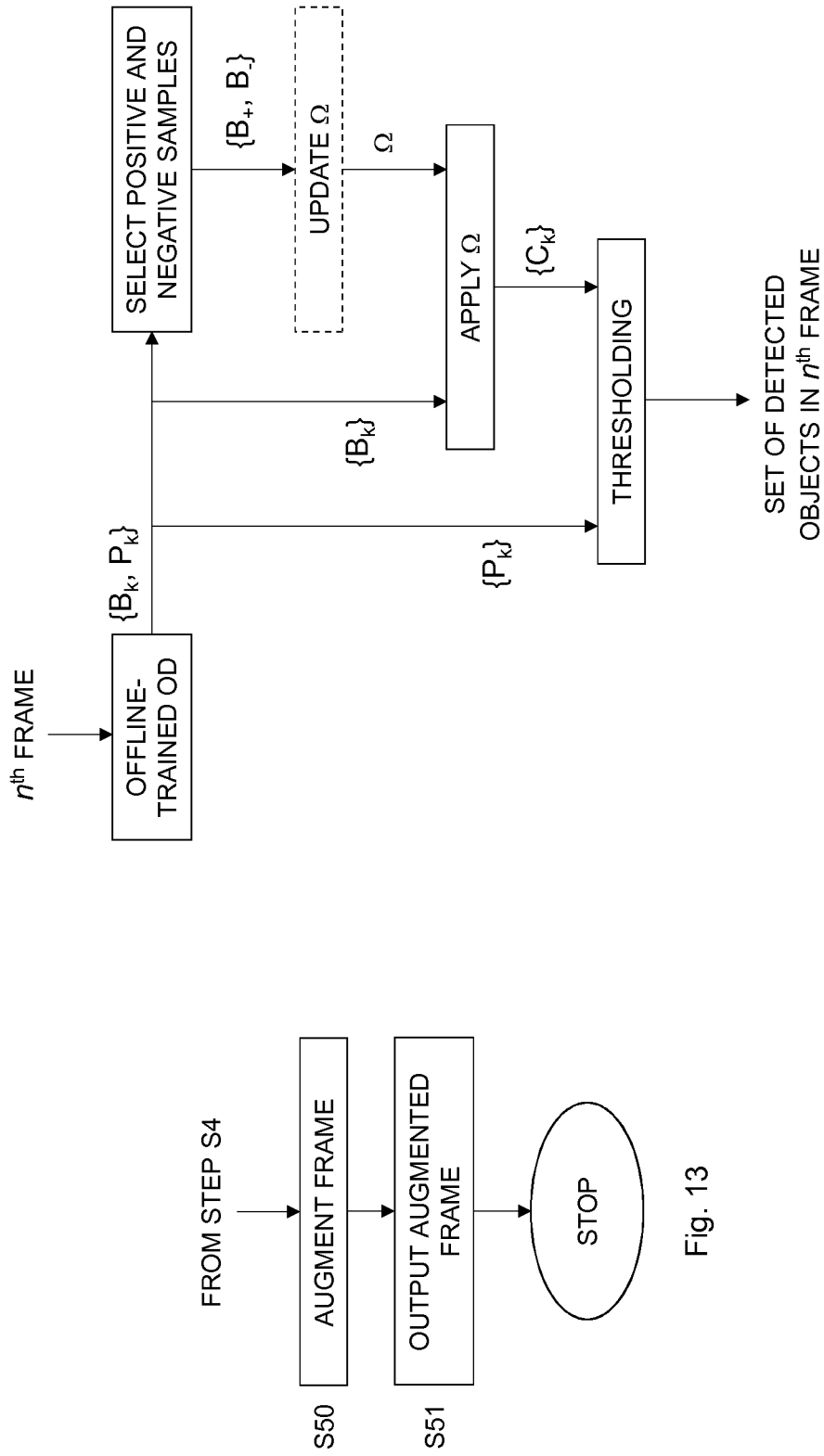

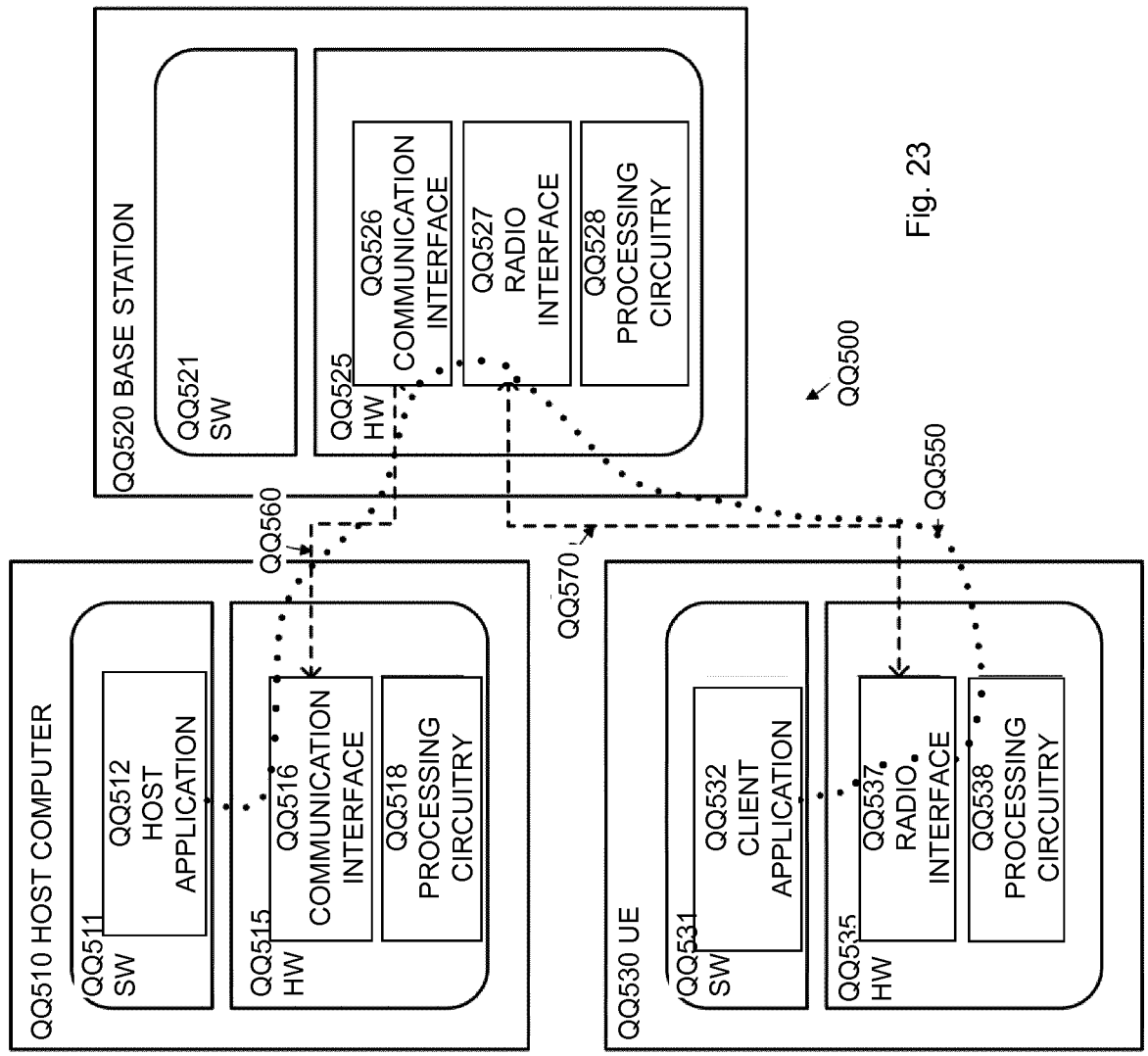

OBJECT LOCATION DETERMINATION IN FRAMES OF A VIDEO STREAM

TECHNICAL FIELD

The invention generally relates to a method, an object locator, a computer program, a computer program product, a user device and a network node for objection location determination in frames of a video stream.

BACKGROUND

Augmented reality (AR) is a direct or indirect live view of a physical, real-world environment whose objects are augmented, i.e., perceptually enriched, by computer-generated perceptual information. The overlaid perceptual information can be constructive, i.e., additive to the natural environment, or destructive, i.e., masking of the natural environment.

An increasing number of AR applications for user devices, such as smart phones and tablets, have been developed to overlay virtual objects on the real-world view. The core technological challenges in such applications are:
1) identifying real-world objects and their positions on the screen, typically denoted object detection (OD) or object recognition in the art;
2) tracking objects of interest, typically denoted object tracking (OT) in the art; and
3) augmenting the scene with artificial objects, labels, or other types of perceptual information.

Previously, some of the best solutions in the area of object detection were considered to be based on Deformable Part Models (DPM) with Histogram of Oriented Gradients (HOG) features. In the last years, even more accurate solutions based on Convolutional Neural Network (CNN) technology are being considered as state of the art in the area of object detection. These solutions detect objects in a given frame or picture of a video stream, but require significant processing power to operate in real-time. Therefore, CNNs typically run on servers equipped with modern Graphics Processing Units (GPUs) with large amount of memory. These CNNs consist of tens of millions of parameters trained on large annotated datasets. In comparison to classical object detectors, the modern CNNs bring more accurate detection but at the cost of heavy offline training, which may take weeks of processing time on a state-of-the-art hardware.

Despite of the impressive performance of CNN-based object detectors, the specifics of their training may lead to shortcoming during object detection. For instance, at detection time, the large CNNs do not have the capability to learn from the visual appearance of objects in the particular video stream. In other words, the CNNs have no mechanism for on-the-fly adaptation to the particular video stream that they are applied on. This is a significant problem, since the statistics of the datasets used for offline training could be quite different from the statistics in the particular video stream. Furthermore, the total offline training space of CNNs is much larger than the space of the particular video stream, in which the objects are being detected. As an example, a sports video, which consists of teams with blue and red uniforms, is a tiny fraction of a training set with sports videos with all possible uniforms, backgrounds and lighting conditions. In a similar way, vehicles in a particular Formula 1 race span just a tiny subspace of the total space of vehicles used for offline CNN training.

As a consequence, due to this lack of flexibility and on-the-fly adaptation, the current object detectors may miss objects and/or detect false positives during object detection in a video stream.

SUMMARY

It is a general objective to improve detection accuracy based on characteristics of a processed video stream.

This and other objectives are met by aspects of the invention as well as embodiments as disclosed herein.

An aspect of the invention relates to an object locating method. The method comprising applying, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The method also comprises determining, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

Another aspect of the invention relates to an object locator comprising a processing circuitry and a memory comprising instructions executable by the processing circuitry. The processing circuitry is operative to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The processing circuitry is also operative to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

Further aspects of the invention relate a user device and network node comprising an object locator according to the invention.

A further aspect of the invention relates to a computer program comprising instructions, which when executed by at least one processing circuitry, cause the at least one processing circuitry to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The at least one processing circuitry is also caused to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

Yet another aspect of the invention relates to a computer program product having stored thereon a computer program comprising instructions which, when executed on a processing circuitry, cause the processing circuitry to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The at least one processing circuitry is also caused to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

The present aspects of the invention improve detection accuracy of an object detection by introducing bias in the detection process and where such bias is based on local characteristics of the particular video stream. As a consequence, an offline trained object detection is combined with a context-based object classifying model that is on-the-fly generated and updated based on the particular video stream.

BRIEF DESCRIPTION OF THE DRAWINGS

The embodiments, together with further objects and advantages thereof, may best be understood by making reference to the following description taken together with the accompanying drawings, in which:

FIG. 1 is an overview of a client—server architecture with object detection in the server;

FIG. 2 is an overview of a user device comprising an object detector;

FIG. 3 schematically illustrates proposal regions output by an object detector for a frame of a video stream;

FIG. 4 schematically illustrates the regions in FIG. 3 following thresholding according to prior art;

FIGS. 11A-11C illustrate different embodiments of updating the context-based object classifying model;

FIG. 12 is a flow chart illustrating an additional, optional step of the method shown in FIG. 5 according to an embodiment;

FIG. 13 is a flow chart illustrating additional, optional steps of the method shown in FIG. 5 according to an embodiment;

FIG. 14 is a block diagram illustrating an embodiment of object location determination;

FIG. 23 is a schematic diagram illustrating an example of a host computer communicating via a base station with a user equipment over a partially wireless connection in accordance with some embodiments.

DETAILED DESCRIPTION

Figure 6:
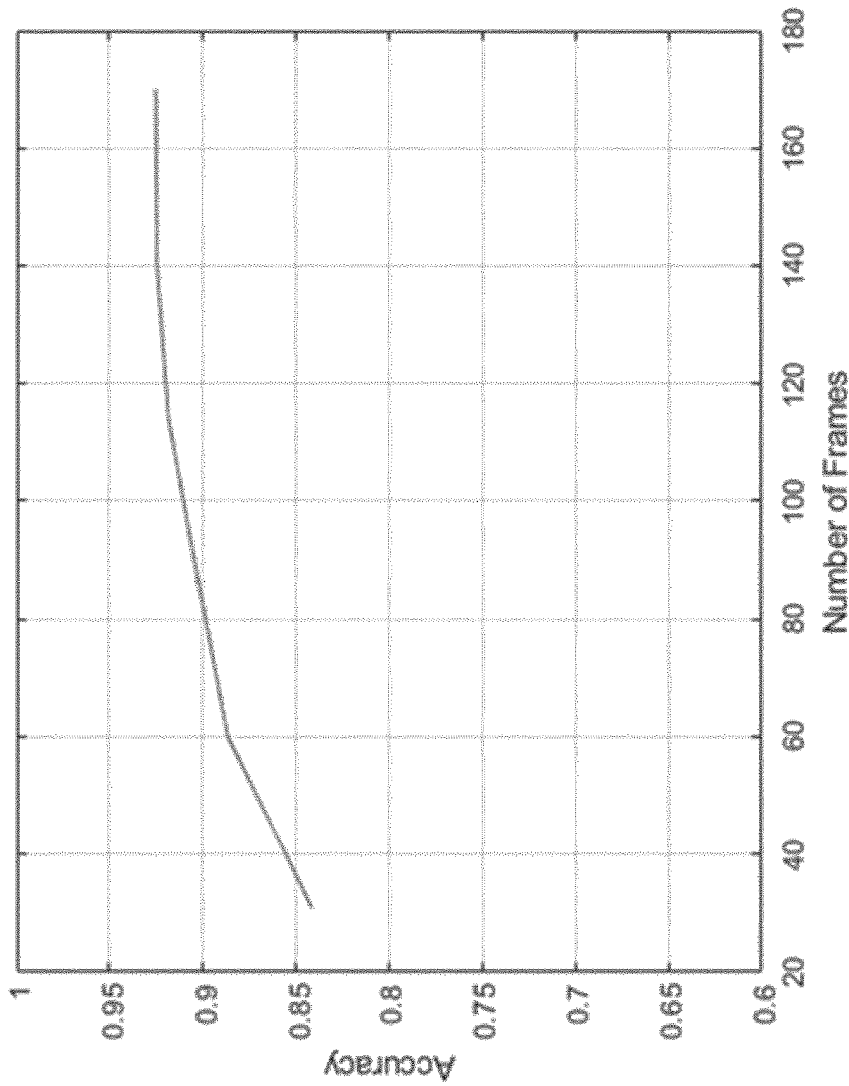
FIG. 6 is a diagram illustrating convergence properties of a context-based object classifying model with incremental learning.

Throughout the drawings, the same reference numbers are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention generally relates to a method, an object locator, a computer program, a computer program product, a user device and a network node for objection location determination in frames of a video stream.

A user device—server architecture for augmented reality according to an embodiment is shown in FIG. 1. The user device 1, represented by a wireless user device 1 in FIG. 1, comprises or is connected to a camera 2 used to capture video and record a video stream. Pictures or video frames, for simplicity referred to as frames herein, of the video stream may then sent from the user device 1 to an objection detection (OD) server 4. This frame transmission could involve streaming the video stream to the OD server 4, i.e., substantially transmitting all the frames of the video stream to the OD server 4. In an alternative embodiment, individual, typically timestamped frames are sent to the OD server 4 for object detection.

The OD server 4 comprises an object detector 3 for performing object detection on the received frames, or at least for a portion thereof. This object detection involves detecting objects in a processed frame and determining information of the detected object, including object location representation and detection probability and typically also object type. Object location representation defines a region of or within the processed frame. Detection probability represents a likelihood that the region of or within the frame defined by the object location representation comprises an object. Object type defines the type or class of the detected object, such as car, pedestrian, house, etc.

This so-called detection information, i.e., object location representation, detection probability and optional objection type, is returned to the user device 1 together with an indication of for which frame the object detection has been performed, such as in terms of a timestamp of the relevant frame. The detection information is then used by the user device 1 for augmentation of a video presented on a screen.

The OD server 4 may have access to offline trained Convolutional Neural Network based (CNN-based) object detectors and modern Graphics Processing Units (GPUs) with large amount of memory. Such CNNs typically comprise tens of millions of parameters trained offline on large annotated datasets, such as PASCAL VOC (Everingham, et al., "The PASCAL Visual Object Classes (VOC) challenge", *International Journal of Computer Vision* (2010) 88: 303-338) or ImageNet (Deng et al., "ImageNet: A large-scale hierarchical image database", in 2009 *IEEE Conference on Computer Vision and Pattern Recognition* (2009)).

Examples of such CNN-based object detectors 3 include Faster R-CNN (Ren et al., "Faster R-CNN: Towards real-time object detection with region proposal networks", *IEEE Transactions on Pattern Analysis and Machine Intelligence* (2017) 39(6): 1137-1149), SSD (Liu et al., "SSD: Single shot multibox detector", *Proceedings of the European Conference on Computer Vision* (ECCV) (2016)) and YOLO9000 (Redmon and Farhadi, "YOLO9000: Better, faster, stronger", 2017 *IEEE Conference on Computer Vision and Pattern Recognition* (CVPR) (2017)).

In another implementation example, the objection detector 3 is implemented in the user device 1 as shown in FIG. 2. Hence, then the user device 1 comprises both the camera 2 used to capture video and generate the video stream and the object detector 3 that processes frames of the video stream for the purpose of detecting objects therein. This implementation thereby relaxes the need for transmitting frames to a remote OD server 4 and receiving the detection information therefrom but instead requires implementation of the object detector 3 including the offline trained object detection model used by the object detector 3 at the user device 1.

Regardless of the implementation site of the object detector 3, i.e., remotely in an OD server 4 as in FIG. 1 or locally in the user device 1 as in FIG. 2, the specifics of the training of the object detector 3 may lead to shortcoming during object detection. The object detector 3 does not have the capability to learn from the visual appearance of objects in the particular video stream. In other words, the object detector 3 has no mechanism for on-the-fly adaptation to the particular video stream. This is a significant problem, since the statistics of the datasets, such as PASCAL VOC and ImageNet, used for offline training could be quite different from the statistics in the particular video stream, and the total offline training space of the object detector 3 is much larger than the space of the particular video stream, in which the objects are being detected.

FIG. 3 schematically illustrates the output of a traditional offline trained object detector for a frame 10 of a video stream. The object detector generates a number of proposal regions 12, 14, typically referred to as bounding boxes in the art. Each such region 12, 14 is associated with a detection probability having a value, typically ranging from 0 up to 1. A high value of the detection probability, e.g., 1 or close to 1, represents a high likelihood that the region 12, 14 of the frame 10 comprises an object 11, 13 and a low value, e.g., 0 or close to 0, represents a low likelihood that the region 12, 14 of the frame 10 comprises an object 11, 13. The detection probabilities are then compared to a defined threshold value $T_{OD}$. If a detection probability is above, or equal to or above, this threshold value $T_{OD}$ the region 12, 14 is kept, whereas regions being associated with detection probabilities that are equal to or below, or below, the threshold value $T_{OD}$ are discarded.

FIG. 4 illustrates the regions in FIG. 3 following thresholding and the removal of regions being associated with low detection probabilities. As can be seen in FIG. 4, the object detector may fail to detect objects 13 in the frame 10 and/or may keep false positives, i.e., regions 14 that actually do not contain any objects.

Such errors in the object detection are at least partly due to that the object detector is offline trained on large databases, whereas the particular video stream merely constitutes a tiny subspace of the total video content used to train the object detector, and the statistics of the datasets used for offline training could be quite different from the statistics of the particular video stream. More importantly, the offline trained object detector lacks flexibility and cannot learn on-the-fly or adapt to the particular video stream.

The present invention relates to a post-processing that can compensate for the lack of flexibility in the modern offline-trained object detectors, such as CNN-based object detectors. A context-based object classifying model generated and learned on-the-fly based on the particular video stream is used to introduce bias in the thresholding process. The invention thereby brings significant improvements in the detection accuracy at minimum increase in computational cost. As a consequence, the invention increases the chances of detecting objects 13 missed by the object detector as well as rejecting and discarding false positives.

Figure 5:
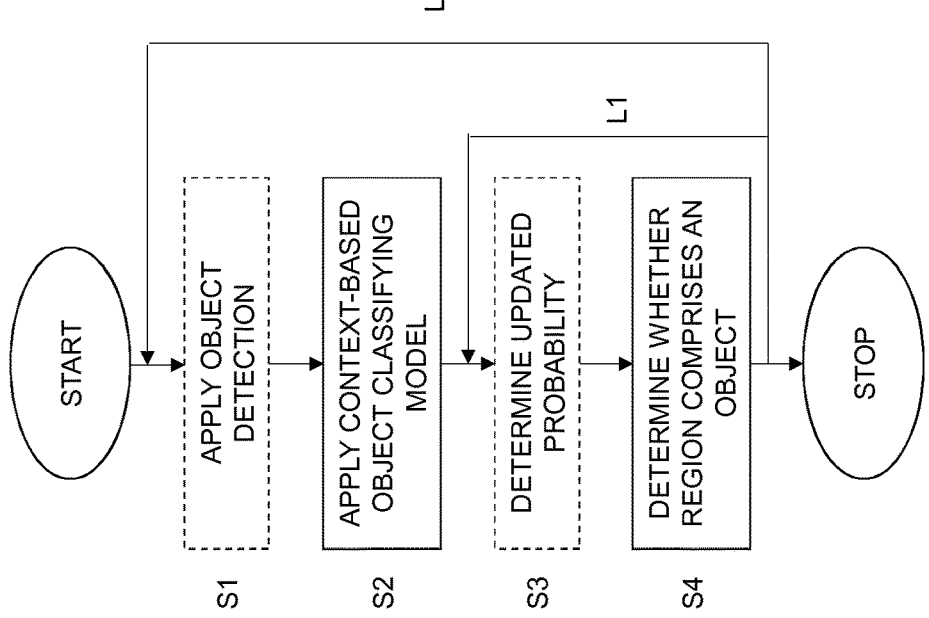
FIG. 5 is a flow chart illustrating an object locating method according to an embodiment.

FIG. 5 is a flow chart illustrating an object locating method according to an embodiment. The steps or operations of the method are performed for at least one frame of a video stream, which is schematically illustrated by the line L2. Step S2 of the method comprises applying a context-based object classifying model to a set of object location representations to obtain a context-adapted classification probability for each object location representation of the set. The object location representations of the set are derived from or in an object detection applied to the at least one frame. Each object location representation of the set defines a region of the at least one frame and each context-adapted classification probability represents a likelihood that the region of the at least one frame defined by the object location representation comprises an object. The context-based object classifying model applied in step S2 is generated based on object location representations from previous frames of the video stream.

The following step S4, and optional step S3, is performed for each object location representation of at least a portion of the set, which is schematically illustrated by the line L1. Step S4 comprises determining whether the region of the at least one frame defined by the object location representation comprises an object based on the context-adapted classification probability and a detection probability. The detection probability is derived from the object detection and represents a likelihood that the region of the at least one frame defined by the object location representation comprises an object.

The traditional approach in determining locations of objects in a frame is to use the detection probabilities $P_k$ derived from the object detection together with the previously mentioned detection threshold value $T_{OD}$ in order to decide which object location representations $B_k$ derived from the object detection that most likely contain objects, i.e., when going from FIG. 3 to FIG. 4. Hence, this approach could be represented as $f(P_k, T_{OD})$, wherein $f( )$ represents the thresholding function.

The present invention not only uses the detection probabilities $P_k$ derived from the object detection but also uses context-adapted classification probabilities $C_k$ derived from the context-based object classifying model in the determination of whether a region in the frame comprises any object. Thus, this approach could be represented as $g(P_k, C_k, T_{OD})$, wherein $g( )$ represents the thresholding function.

The context-adapted classification probabilities determined in step S2 in FIG. 5 by applying the context-based object classifying model to the set of object location representations could be regarded as a bias introduced in the decision process. The context-adapted classification probabilities are, in clear contrast to the detection probabilities derived from the objection detection, derived from a model that is generated based on and thereby adapted to the particular video stream. Thus, the context-based object classifying model is indeed context-based, i.e., based on the actual video content and statistics of the current video stream, since it is generated based on and preferably trained on object location representations from previous frames of the video stream. This is in clear contrast to the object detection and model used by the object detector, which is generated and trained on large datasets, such as PASCAL VOC and ImageNet, as mentioned in the foregoing.

Hence, the context-based object classifying model is preferably generated at run-time, online or on-the-fly based on object location representations from previous frame of the video stream. At run-time, online or on-the-fly as used herein indicates that the context-based object classifying model is generated, and preferably updated or trained, during the actual processing of the frames of the video stream, i.e., in connection with applying the object locating method of FIG. 5 to frames of the video stream.

This is in clear contrast to the object detection model employed by the object detector, which is offline-trained based on large databases to be ready once frames are input for object detection. This means that no training or adaptation of the object detection model takes place based on the frames of the video stream.

The inclusion of the context-associated classification probability in the decision process will lead to a more accurate object location and thereby a rejection of object location representations lacking objects, such as object location representation 14 in FIG. 4, but also identifying objects, such as object 13 in FIG. 4, that would be missed when merely using the detection probability in the decision process. The context-associated classification probability will in particular improve the decision process for those object location representations that are hard to process and have a detection probability close to the detection threshold value $T_{OD}$. The context-associated classification probability will then in many cases bias the detection probability so that the updated probability ends at the correct side of the detection threshold value $T_{OD}$, i.e., above $T_{OD}$ for those missed object location representations that actually contain an object and below $T_{OD}$ for those object location representations that do not contain any object.

The context-adapted classification probabilities, also referred to as content-adapted classification probabilities or simply classification probabilities herein, are, as mentioned in the foregoing, adapted and based on the current context and content of the video stream. Thus, the context-adapted classification probabilities are generated by the context-based object classifying model, which in turn is generated and preferably updated and learned based on the frames of the current video stream. This is in clear contrast to the detection probabilities, also referred as context-agnostic detection probabilities or content-agnostic detection probabilities herein. The detection probabilities are not adapted nor based on the current context and content of the video stream. In clear contrast, the detection probabilities are generated by the object detection, which is in turn generated based on large, generic databases, such as such as PASCAL VOC and ImageNet. This means that two probabilities, the context-adapted classification probability and the (context-agnostic) detection probability, are derived for each object location representation of at least the portion of the set. One of these two probabilities are based on the current context and content of the video stream, i.e., the context-adapted classification probability, and the other is not based on the current context or content of the video stream, i.e., the detection probability.

In an embodiment, the method comprises step S3 as shown in FIG. 5. This step S3 comprises determining an updated probability based on the context-adapted classification probability and the detection probability. In this embodiment, step S4 comprises determining, for each object location representation of at least the portion of the set, whether the region of the at least one frame defined by the object location representation comprises an object based on the updated probability.

In this embodiment, the location determining or thresholding function could be defined as $f(Q_k, T_{OD})$, wherein $Q_k$ represents the updated probability determined based on the context-adapted classification probability $C_k$ and the detection probability $P_k$ in step S3, i.e., $Q_k=h(P_k, C_k)$, wherein $h(\ )$ represents determination of the updated probability $Q_k$. Hence, this embodiment uses the updated probability $Q_k$ rather than only the detection probability $P_k$ in the location determination or thresholding function.

In an embodiment, step S3 in FIG. 5 comprises determining, for each object location representation of at least the portion of the set, the updated probability based on a weighted combination of the context-adapted classification probability and the detection probability. Hence, in this embodiment the function $h(\ )$ is in the form of a weighted combination.

In an implementation example, step S3 comprises determining, for each object location representation $B_k$ of at least the portion of the set, the updated probability based on $(1-\lambda)\times P_k+\lambda\times C_k$. In this implementation example, $\lambda$ is a weighting factor.

Hence, in this implementation example, step S4 of FIG. 5 comprises determining, for each object location representation $B_k$ of at least the portion of the set, that the region of the at least one frame defined by the object location representation $B_k$ comprises an object if $(1-\lambda)\times P_k+\lambda\times C_k\geq T_{OD}$, or $(1-\lambda)\times P_k+\lambda\times C_k<T_{OD}$, and otherwise determining that the region of the at least one frame defined by the object location representation $B_k$ does not comprise any object.

The threshold value $T_{OD}$ is preferably predetermined. In an embodiment, the threshold value $T_{OD}$ is selected within an interval of form 0.3 up to 0.7, such as 0.3, 0.4, 0.5, 0.6 or 0.7, preferably 0.5.

Figure 7:
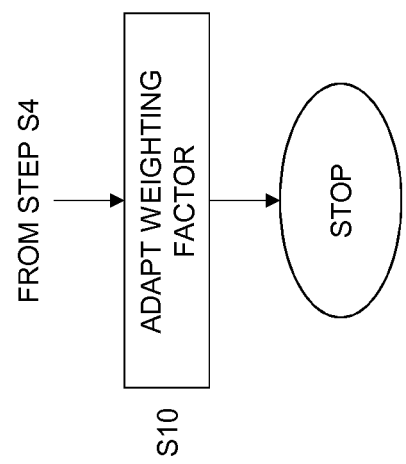
FIG. 7 is a flow chart illustrating an additional, optional step of the method shown in FIG. 5 according to an embodiment.

In an embodiment, the weighting factor $\lambda$ is also predetermined. In another embodiment, the value of the weighting factor $\lambda$ is adaptive and preferably increasing with time. A reason for such an adaptation of the weighting factor $\lambda$ is that the accuracy of the context-based object classifying model generally increases with time. FIG. 6 is a diagram illustrating convergence properties of a context-based object classifying model with incremental learning. As is seen in the diagram, the accuracy of the context-based object classifying model increases over time and then reaches a plateau after about 120 frames, which corresponds to 4 s of video at 30 frames per second (fps). As the accuracy of the context-based classification model increases, the context-adapted classification probability in the weighted combination could be weighted heavier and heavier, such as until the accuracy of the context-based classification model reaches the plateau. In this embodiment, the method may therefore comprise an additional step S10 as shown in FIG. 7. This step S10 comprises adapting a value of the weighting factor A. based on the accuracy of the context-based classification model. In other words, $\lambda=q(A)$, wherein $q(\ )$ represents a function and $\lambda$ represents the accuracy of the context-based object classifying model. As is shown in FIG. 6, the accuracy of the context-based object classifying model is dependent on time and in particular dependent on updating the context-based object classifying model. This means that the value of the weighting factor $\lambda$ could alternatively be dependent on time, such as in the form of number of frames currently processed in the video stream, or alternatively be dependent on the number of times the context-based object classifying model has been updated.

Determining whether the region defined by the object location representation comprises an object in step S4 based on the updated probability should merely be seen as an illustrative, but non-limiting, example of how to complement the detection probability with the context-adapted classification probability in the determination process.

In an alternative embodiment, step S4 comprises determining that the region of the at least one frame defined by the object location representation $B_k$ comprises an object if $P_k\geq T_{OD}+\Delta$ or if $T_{OD}-\Delta\leq P_k\leq T_{OD}+\Delta$ and $C_k\geq T_{OD}$ and otherwise determining that the region does not comprise any object. The parameter $\Delta$ defines a probability interval centered at the threshold value $T_{OD}$ as indicated with bracket in FIG. 8. Hence, if the detection probability generated at the object detection is sufficiently high, i.e., $\geq T_{OD}+\Delta$, the region is determined to most likely comprise an object. If the detection probability, however, is within the probability interval, $[T_{OD}-\Delta, T_{OD}+\Delta]$, an additional check is done to determine whether the region most likely comprise an object, i.e., when $C_k\geq T_{OD}$, or not, i.e., when $C_k<T_{OD}$. Correspondingly, for sufficiently small detection probabilities, i.e., $P_k<T_{OD}-\Delta$, the region is determined to most likely not comprise any object.

The parameter $\Delta$ is, for instance, selected within an interval of from 0.1 up to 0.3, such as 0.1, 0.2 or 0.3, preferably 0.2.

In an embodiment, the method comprises step S1 as shown in FIG. 5. This step S1 comprises applying the object detection to the at least one frame to obtain the set of object representations and the associated detection probabilities.

Figure 9:
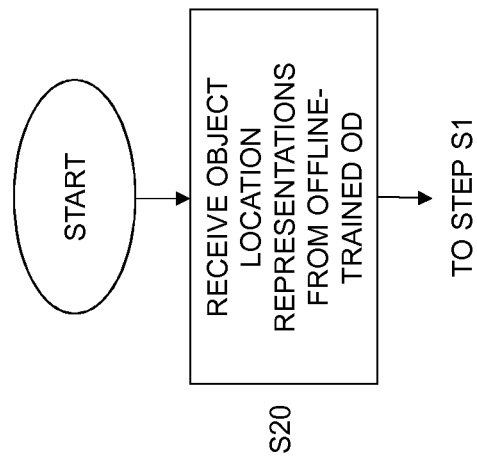
FIG. 9 is a flow chart illustrating an additional, optional step of the method shown in FIG. 5 according to various embodiments.

The object detection applied to the at least one frame in step S1 could be performed by an external object detector 3, such as implemented in an OD server 4, whereas the object locating method is implemented in and performed by an object locator 100 in the user device 1. In such a case, the set of object location representations and the associated detection probabilities are sent from the OD server 4 to the user device 1. This is schematically illustrated in FIG. 1 and further shown in FIG. 9. In such a case, the method preferably comprises step S20, which comprises receiving the set of object location representations and the associated detection probabilities from an offline-trained object detector. In FIG. 1 this offline trained object detector 3 is implemented in the OD server 4. In FIG. 2, the offline trained object detector 3 is instead implemented in the user device 1. Thus, in FIG. 2, the object detection applied to the at least one frame in step S1 is then performed by an object detector 3 implemented in the same user device 1 as the object locator 100.

Figure 10:
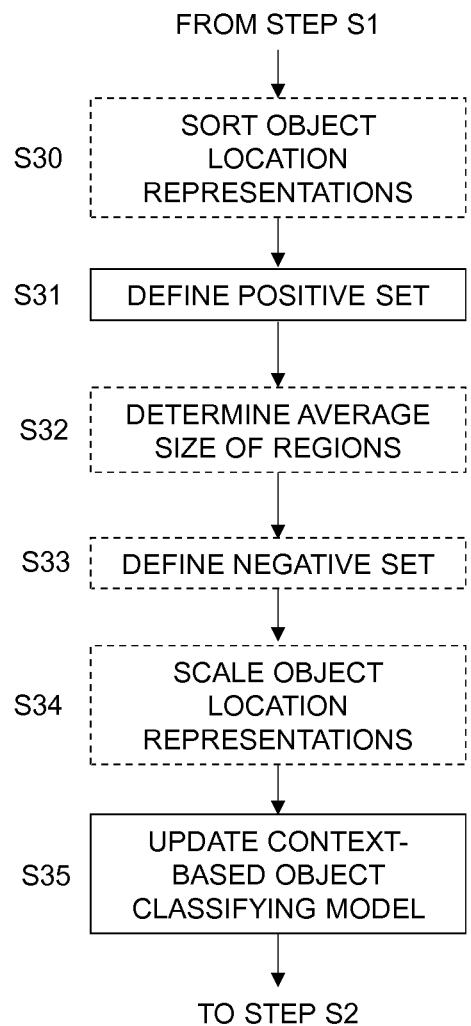
FIG. 10 is a flow chart illustrating additional, optional steps of the method shown in FIG. 5 according to various embodiments.

In an embodiment, the object locating method comprises additional steps S31 and S35 as shown in FIG. 10. The method then continues form step S1 in FIG. 5 or step S20 in FIG. 9. Step S31 comprises defining a positive set comprising the object location representations of the set having an associated detection probability exceeding a threshold value $T_+$. The following step S35 comprises updating the context-based object classifying model based on the positive set.

This embodiment thereby comprises identifying those object location representations $B_k$ of the set having an associated detection probability $P_k$ that exceeds the threshold value $T_+$, i.e., those $B_k$ for which $P_k>T_+$. Those object location representations form the so called positive set B. This further implies that the object location representations $B_k$ belonging to the positive set $B_+$ all have an associated detection probability $P_k$ that exceeds the threshold value $T_+$ but is equal to or below the maximum value for the detection probability, typically 1, i.e., $T_+<P_k\leq 1$. Illustrative, but non-limiting, examples of suitable value for the threshold value $T_+$ can be selected within an interval of from 0.65 up to 0.85, such as 0.65, 0.70, 0.75, 0.80, 0.85, preferably 0.75.

The context-based object classifying model is then updated or trained based on the objection location representations in the positive set $B_+$ in step S35. The method then continues to step S2 in FIG. 5, where the updated context-based object classifying model is applied to the set of object location representations.

As mentioned in the foregoing, the generation of the context-based classifying model is preferably performed at run-time. The update thereof is preferably also performed at run-time. In such a case, step S31 comprises extracting, at run-time and into the positive set, the object location representations of the set having an associated detection probability exceeding the threshold value. Step S35 correspondingly comprises updating, at run-time, the context-based object classifying model based on the positive set.

In an embodiment, the method also comprises step S33 as shown in FIG. 10. This step S33 comprises defining a negative set $B_-$ comprising M object location representations of the set having lowest associated detection probability. In a preferred embodiment, M represents the number of object location representations in the positive set B. In this embodiment, step S35 comprises updating the context-based object location model based on the positive set $B_+$ and based on the negative set $B_-$.

Thus, in an embodiment, the context-based object location model is updated or trained based on the M object location representations of the set having the highest associated detection probability, i.e., the positive set $B_+$, and the M object location representations of the set having the lowest associated detection probability, i.e., the negative set $B_-$. The update in step S35 is thereby performed based on balanced sets of object location representations, i.e., the same number of object location representations in the two sets.

Figure 8:
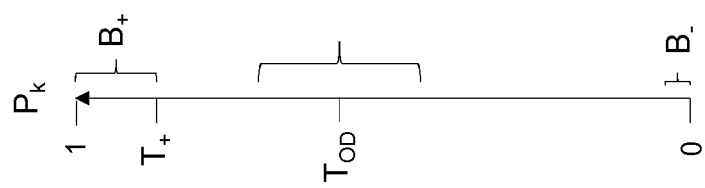
FIG. 8 schematically illustrates distribution of detection probabilities and defining positive and negative sets.

FIG. 8 schematically illustrates distribution of detection probabilities and the definition of the positive and negative sets. The figure also indicates the previously mentioned detection threshold value $T_{OD}$. The positive set $B_+$ includes those object location representations $B_k$ of the set having an associated detection probability $P_k$ that exceeds the threshold value T. The total number of these object location representations $B_k$ of the positive set $B_+$ is M. Then the M object location representations $B_k$ of the set having the lowest detection probabilities $P_k$ are identified and included in the negative set $B_-$. As schematically shown in FIG. 8, most of the object location representations $B_k$ in the negative set $B_-$ will have a detection probability $P_k$ equal to or close to 0. This means that the object location representations $B_k$ in the negative set $B_-$ are generally grouped close to 0 in the distribution shown in FIG. 8, whereas the object location representations $B_k$ in the positive set $B_+$ are distributed within the interval of $(T_+, 1]$.

The update or training of the context-based object classifying model in step S35 can be performed according to various embodiments based on the object location representations in the positive and negative sets. For instance, the online sequential learning algorithm disclosed in Liang et al., "A fast and accurate online sequential learning algorithm for feedforward networks", *IEEE Transactions on Neural Networks* (2006) 17(6): 1411-1423 could be used in step S35. Other examples of algorithms used to generate and update the context-based object classifying model include support vector machines (SVM) or regularized online sequential extreme learning machines (OS-ELM), see an example in Appendix A.

Although usage of balanced sets for updating the context-based object classifying model in step S35 is preferred, the embodiments are not limited thereto and may instead use unbalanced sets, i.e., not necessarily the same number of object location representations in the positive set as in the negative set.

In an embodiment, the method also comprises step S30 as shown in FIG. 10. This step S30 comprises sorting the object location representations of the set based on the detection probabilities in an order of likelihoods that the region of the at least one frame defined by the object location representation comprises an object.

In this embodiment, the object location representations of the set are thereby sorted based on their respective value of the associated detection probabilities. The object location representations of the set may then be sorted in step S30 in increasing order of the detection probabilities, i.e., from the lowest detection probability, e.g., 0 or close to 0, up to the highest detection probability, e.g., 1 or close to 1. In another embodiment, the object location representations of the set are instead sorted in step S30 in decreasing order of the detection probabilities, i.e., from the highest detection probability to the lowest detection probability.

The sorting of object location representations in step S30 simplifies identification of the object location representations to include in the positive set in step S31 and preferably to include in the negative set in step S33.

The method as shown in FIG. 10 may optionally comprise step S32. This step S32 comprises determining an average size of the regions of the at least one frame defined by the object location representations in the positive set. In this embodiment, step S33 comprises selecting the M object location representations of the set i) having the lowest associated detection probability and ii) defining a region of the at least one frame having a size that does not deviate from the average size with more than a threshold value.

Thus, the average size of the regions defined by the object location representations in the positive set is first determined in step S32. Then, when selecting object location representations of the set to include in the negative step in step S33, a selection criterion is introduced by requiring the object location representations to define a region that has a size that does not deviate from the average size with more than a threshold value. For instance, height and width of the region should not deviate more than a given percentage of the average height and the average width of the regions defined by the object location representations in the positive set. In other words, $\vartheta \times \hat{h} \leq h_k \leq (2-\vartheta) \times \hat{h}$ and $\vartheta \times \hat{w} \leq w_k \leq (2-\vartheta) \times \hat{w}$, wherein $\hat{h}$, $\hat{w}$ represent the average height and the average width of the object location representations in the positive set, $h_k$, $w_k$ represent the height and width of the current object location representation and $\vartheta$ is a threshold value that is larger than 0 but smaller than 1. Illustrative, but non-limiting, examples of the threshold value can be selected within an interval of from 0.3 up to 0.7, such as 0.3, 0.4, 0.5, 0.6, 0.7, preferably 0.5. In this example, a same threshold value has been used for the height and the width of the regions. In another embodiment, different threshold values could be used for the height and the width.

The inclusion of the selection criterion based on size of the regions defined by the object location representations when defining the negative set increases the accuracy when updating the context-based object classifying model in step S35 by forcing the object location representations to define fairly the same region sizes and thereby removing extreme outliers, i.e., object location representations defining very small or large region sizes.

Another embodiment of increasing the accuracy when updating the context-based object classifying model in step S35 is shown in step S34 in FIG. 10. This step S34 comprises scaling the object location representations in the positive set and the object location representations in the negative set to a common resolution. Hence, in this embodiment the object location representations in the positive and negative sets are first rescaled, if necessary, to a common, predetermined resolution, i.e., size, e.g., height and width, before updating the context-based object classifying model in step S35.

The update of the context-based object classifying model in step S35 can be scheduled according to different embodiments as schematically shown in FIGS. 11A-11C. FIG. 11A represents an implementation example, in which the context-based object classifying model $\Omega$ is updated at each frame of the video stream, excluding the first frame or optionally excluding the first L frames for some positive value of the parameter L. In this case, the first frame or the first L frames are used to generate the context-based object classifying model $\Omega$, whereas following frames of the video stream are used to update the context-based object classifying model $\Omega$. In this implementation example, the context-based object classifying model $\Omega$ is thereby updated at each frame of at least a portion of the video stream to thereby be updated as ever more object location representations are available. This approach achieves the most accurate context-based object classifying model $\Omega$ that is indeed up to date and continuously trained on the frames of the video stream. However, the frame-based update comes at the cost of increased computations.

FIG. 11B illustrates another implementation example for performing the update in step S35. This embodiment accumulates object location representations in the positive and negative sets for N frames. As a consequence, the update of the context-based object classifying model $\Omega$ is thereby performed for each $N^{th}$ frame of the video stream. In this implementation example, the update is thereby scheduled at regular intervals, every $N^{th}$ frame, in the video stream. This further means that the number of object location representations included in the positive and negative sets at each scheduled update may differ from update occasion to update occasion depending on the number of object location representations that have been extracted from the previous frames since the last update occasion.

FIG. 11C illustrates a further implementation example for performing the update in step S35. This embodiment accumulates object location representations in the positive and negative set until there are at least a predefined number X of object location representations in the positive and negative set. In this embodiment, a same number of object location representations is thereby present in the positive and negative set at each update occasion. However, the timing of the updates may differ as shown in FIG. 11C implying that in some parts of the video stream object location representations need to be accumulated from many frames until reaching the predefined number X of object location representations, whereas for other parts of the video stream merely a few frames are processed until reaching the predefined number X of object location representations.

Step S3 and S4 in FIG. 5 could be performed for each object location representation of the set, which is schematically illustrated by the line L1. Hence, in such a case step S3 comprises determining, for each object location representation of the set, the updated probability based on the context-adapted classification probability and the detection probability. Step S4 comprises, in this embodiment, determining, for each object classification representation of the set, whether the region of the at least one frame defined by the object location representation comprises an object based on the updated probability.

In another embodiment, steps S3 and S4 are not necessarily performed for each object location representation of the set but merely for a portion thereof. For instance and with reference to FIG. 8, object location representations of the set having a detection probability as determined in the object location close to the maximum value, such as 1, or close to the minimum value, such as 0, are most likely correctly classified as an object location representation defining a region of the at least one frame that comprises or does not comprise any object. Hence, these object location representations can most likely be correctly classified, i.e., define a region with an object and should remain or define a region without any object and should be removed, merely based on the detection probability. However, object location representations having associated detection probabilities that are close to the threshold value $T_{OD}$ are more likely to be misclassified when using solely the detection probabilities from the object detection. These object location representations are indicated by the bracket centered at the threshold value $T_{OD}$ in FIG. 8. This means that in particular such object location representations having a detection probability close to the threshold value $T_{OD}$ would benefit from the invention.

In such a case, the method may comprise an additional step S40 as shown in FIG. 12. This step S40 comprises identifying object location representations of the set having a detection probability within a probability interval. In this embodiment, step S4 of FIG. 5 comprises determining, for each identified object location representation, whether the region of the least one frame defined by the identified object location representation comprises an object based on the updated probability. Hence, in this embodiment, step S4 and optionally also step S3 are performed only for those object location representations that are identified to have an associated detection probability within the probability interval. For instance, the object location representations $B_k$ have an associated detection probability $P_k$ that is within the probability interval, $T_{OD}-\Delta \leq P_k \leq T_{OD}+\Delta$.

In an embodiment, the object location representations generated at the object detection are bounding boxes. Each bounding box represents four parameter values defining a region of the at least one frame.

The bounding box may, for instance, be in the form of a vector defining a coordinate of the region and a size of the region. The coordinate $(x_k, y_k)$ could be any coordinate that allows identification of the position of the region in the at least one frame. The coordinate could, for example, represent the center of the region or one of the corners of the region. The size of the region could be defined by a width $(w_k)$ and a height $(h_k)$ of the region as an illustrative, but non-limiting, example. Hence, in an embodiment the bounding box could be in the form of $B_k=[x_k, y_k, w_k, h_k]$. In an alternative embodiment, the bounding box could include coordinates of opposite corners of the region, i.e., $B_k=[x1_k, y1_k, x2_k, y2_k]$.

FIG. 13 is a flow chart illustrating additional, optional steps of the method shown in FIG. 5. Step S50 comprises augmenting the at least one frame with perceptual information based on the locations of objects in the at least one frame. The augmented at least one frame is then output in step S51.

Thus, by using the location of any objects determined in step S4 based on the detection probabilities and context-adapted classification probabilities, the at least one frame can be augmented with perceptual information based on the locations of the objects.

In a particular embodiment, the type of perceptual information to augment the at least one frame can be selected based on the type of the objects as determined in the object detection.

Perceptual information as used herein relates to any information or data that could be used to augment a scene. Non-limiting, but illustrative, examples of such perceptual information includes name of a detected building, name of a detected person, etc.

FIG. 14 is a block diagram illustrating an embodiment of object location determination. The FIG. illustrates the processing applied to frames of a video stream. A current frame number n of the video stream is input to an offline-trained object detector, such as an offline-trained CNN-based object detector, which produces K proposal regions $\{B_k, P_k\}_{k=1}^{K}$ for the current frame. Here $B_k$ is a bounding box around a region in the current frame, and $P_k$ is the detection probability associated with that region, i.e., likelihood of having an object in that region of the frame. An example of proposal regions for a given frame is shown in FIG. 3. The proposal regions are optionally sorted based on the associated detection probabilities $P_k$. Regions with detection probability above a threshold value $T_+$, such as with a value of 0.75, are selected as positive samples for updating the context-based object classifying model $\Omega$ and are thereby included in the positive set $B_+$ giving a total of M samples in the positive set. From the sorted set $\{B_k, P_k\}_{k=1}^{K}$ M negative samples are selected, starting from the end with lowest detection probability. Only proposal regions with width and height that do not deviate more than, for instance, 50% from the average width and height of the positive set $B_+$, are preferably accepted. These negative samples form the negative set $B_-$. The accumulated regions in the positive and negative sets are scaled to a common, pre-determined resolution, and then used to update the context-based object classifying model $\Omega$. This step could be executed every frame, or alternative, on accumulated regions over several frames. Incremental model adaptation could be used in the update of the context-based object classifying model $\Omega$. The optionally updated context-based object classifying model $\Omega$ is then applied on the total set of region proposals $\{B_k\}$ in the current frame to produce a set of context-adapted classification probabilities $\{C_k\}_{k=1}^{K}$ associated with these regions. The proposal regions are then subject to a thresholding operation to accept or reject region proposals and create a set of detected objects for the current video frame.

The proposed solution brings significant improvement in detection accuracy at minimum increase of computational cost.

Another aspect of the invention relates to an object locator, also referred to as, object locating device. The object locator comprises, in an embodiment, a processing circuitry and a memory comprising instructions executable by the processing circuitry. The processing circuitry is operative to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The processing circuitry is also operative to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

In an embodiment, the processing circuitry is operative to define a positive set comprising the object location representations of the set having an associated detection probability exceeding a threshold value. The processing circuitry is also operative to update the context-based object classifying model based on the positive set.

In an embodiment, the processing circuitry is operative to extract, at run-time and into the positive set, the object location representations of the set having an associated detection probability exceeding the threshold value. The processing circuitry is also operative to update, at run-time, the context-based object classifying model based on the positive set.

In an embodiment, the processing circuitry is operative to define a negative set comprising M object location representations of the set having lowest associated detection probability. M represents the number of object location representations in the positive set. The processing circuitry is also operative to update the context-based object classifying model based on the positive set and the negative set.

In an embodiment, the processing circuitry is operative to determine an average size of the regions of the at least one frame defined by the object location representations in the positive set. The processing circuitry is also operative to select, for the negative set, the M object location representations of the set i) having lowest associated detection probability and ii) defining a region of the at least one frame having a size that does not deviate from the average size with more than a threshold value.

In an embodiment, the processing circuitry is operative to scale the object location representations in the positive set and the object location representations in the negative set to a common resolution.

In an embodiment, the processing circuitry is operative to update the context-based object classifying model for each Nth frame of the video stream or at a frame of the video stream once the positive set comprises at least a predefined number of object location representations. N is a predefined number, In an embodiment, the processing circuitry is operative to sort the object location representations of the set based on the detection probabilities in an order of likelihoods that the region of the at least one frame defined by the object location representation comprises an object.

In an embodiment, the processing circuitry operative to determine, for each object location representation of at least a portion of the set, an updated probability based on the context-adapted classification probability and the detection probability. The processing circuitry is also operative to determine, for each object location representation of at least a portion of the set, whether the region of the at least one frame defined by the object location representation comprises an object based on the updated probability.

In an embodiment, the processing circuitry is operative to determine, for each object location representation of at least the portion of the set, the updated probability based on a weighted combination of the context-adapted classification probability and the detection probability.

In an embodiment, the processing circuitry is operative to determine, for each object location representation $B_k$ of at least the portion of the set, the updated probability based on $(1-\lambda) \times P_k + \lambda \times C_k$. $C_k$ represents the context-adapted classification probability, $P_k$ represents the detection probability and $\lambda$ is a weighting factor.

In an embodiment, the processing circuitry is operative to determine, for each object location representation $B_k$ of at least the portion of the set, that the region of the at least one frame defined by the object location representation $B_k$ comprises an object if $(1-\lambda) \times P_k + \lambda \times C_k \geq T_{OD}$ and otherwise determine that the region of the at least one frame defined by the object location representation $B_k$ does not comprise any object. $T_{OD}$ is a threshold value.

In an embodiment, the processing circuitry is operative to adapt a value of the weighting factor $\lambda$ based on an accuracy of the context-based classification model.

In an embodiment, the processing circuitry is operative to determine, for each object location representation of the set, the updated probability based on the context-adapted classification probability and the detection probability. The processing circuitry is also operative to determine, for each object location representation of the set, whether the region of the at least one frame defined by the object location representation comprises an object based on the updated probability.

In an embodiment, the processing circuitry is operative to identify object location representations of the set having a detection probability within a probability interval. The processing circuitry is also operative to determine, for each identified object location representation, whether the region of the at least one frame defined by the identified object location representation comprises an object based on the updated probability.

In an embodiment, the processing circuitry is operative to apply the object detection to the at least one frame to obtain the set of object location representations and the associated detection probabilities.

In an embodiment, the processing circuitry is operative to receive the set of object location representations and the associated detection probabilities from an offline-trained object detector.

A further aspect of the invention relates to an object locator configured to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The object locator is also configured to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 15:
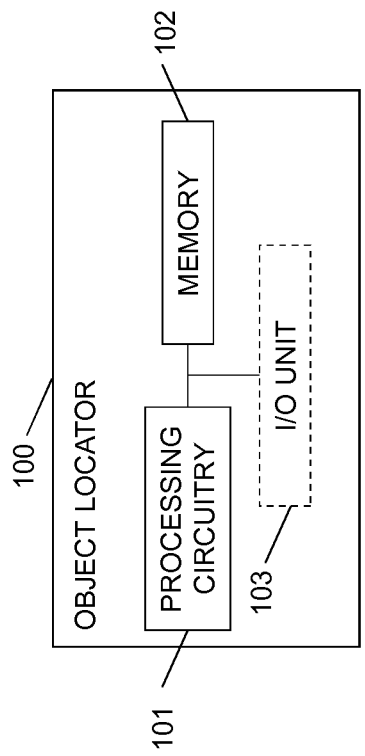
FIG. 15 is a block diagram of an object locator according to an embodiment.

FIG. 15 is a schematic block diagram illustrating an example of an object locator 100 according to an embodiment. In this particular example, the object locator 100 comprises a processing circuitry 101, such as a processor, and a memory 102. The memory 102 comprises instructions executable by the processing circuitry 101.

Optionally, the object locator 100 may also include a communication circuit, represented by a respective input/output (I/O) unit 103 in FIG. 15. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processing circuitry 101 and/or memory 102. By way of example, the I/O unit 103 may include any of the following: a receiver, a transmitter, a transceiver, I/O circuitry, input port(s) and/or output port(s).

Figure 16:
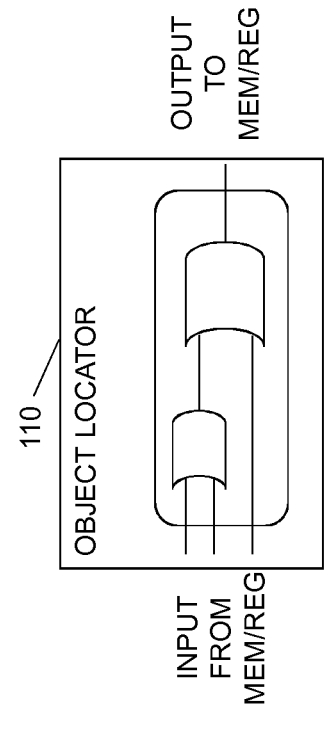
FIG. 16 is a block diagram of an object locator according to another embodiment.

FIG. 16 is a schematic block diagram illustrating an object locator 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 17:
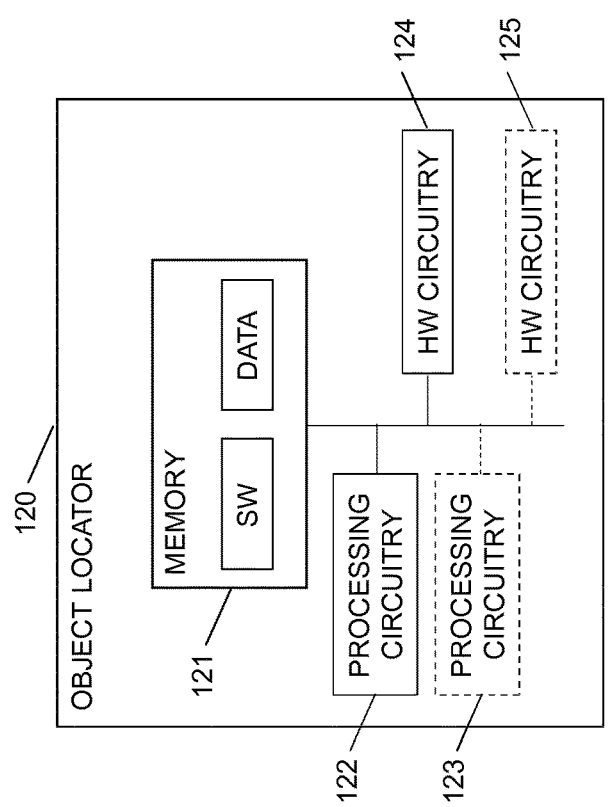
FIG. 17 is a block diagram of an object locator according to a further embodiment.

FIG. 17 is a schematic block diagram illustrating yet another example of an object locator based on combination of both processing circuitry/circuitries 122, 123 and hardware circuitry 124, 125 in connection with suitable memory unit(s) 121. The overall functionality is, thus, partitioned between programmed software for execution on one or more processing circuitries 122, 123 and one or more pre-configured or possibly reconfigurable hardware circuits 124, 125. The actual hardware-software partitioning can be decided by a system designer based on a number of factors including processing speed, cost of implementation and other requirements.

Figure 18:
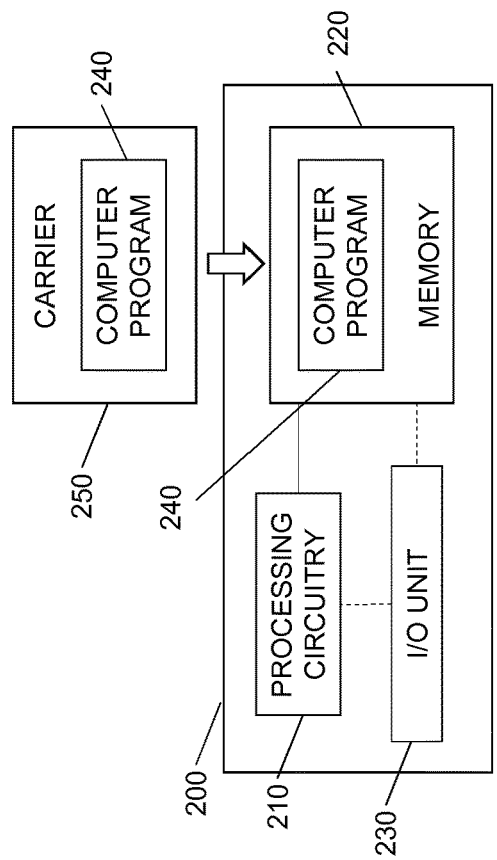
FIG. 18 schematically illustrates a computer program based implementation of an embodiment.

FIG. 18 is a computer program based implementation of an object locator 200 according to an embodiment. In this particular example, at least some of the steps, functions, procedures, modules and/or blocks described herein are implemented in a computer program 240, which is loaded into the memory 220 for execution by processing circuitry including one or more processing circuitries 210. The processing circuitry/circuitries 210 and memory 220 are interconnected to each other to enable normal software execution. An optional I/O unit 230 may also be interconnected to the processing circuitry/circuitries 210 and/or the memory 220 to enable input and/or output of relevant data, such as frames and detection information.

The term 'processing circuitry' should be interpreted in a general sense as any circuitry, system or device capable of executing program code or computer program instructions to perform a particular processing, determining or computing task.

The processing circuitry 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processing circuitry 210, cause the at least one processing circuitry 210 to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The at least one processing circuitry 210 is also caused to determine, for each object location representation of at least a portion of the set, whether the region of the at least one frame defined by the object location representation comprises an object based on the context-adapted classification probability and a detection probability. The detection probability is derived from the object detection and representing a likelihood that the region of the at least one frame defined by the object location representation comprises an object.

The proposed technology also provides a carrier 250, also referred to as computer program product, comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 stored on a computer-readable storage medium, such as the memory 220, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The computer program product 250 has stored thereon a computer program 240 comprising instructions which, when executed on a processing circuitry 201, cause the processing circuitry to apply, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The at least one processing circuitry 210 is also caused to determine, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 19:
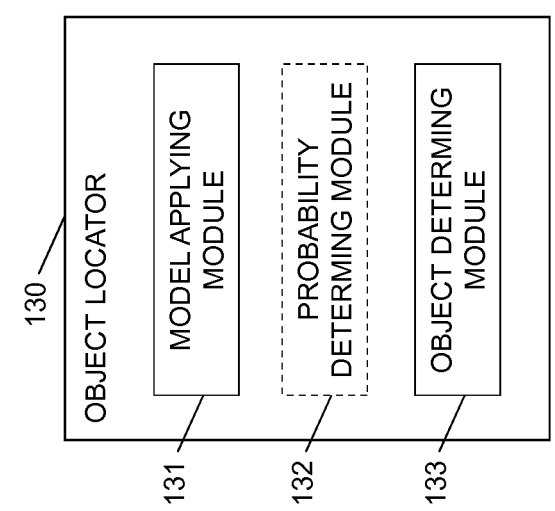
FIG. 19 is a block diagram of an object locator according to another embodiment.

FIG. 19 is a block diagram of an object locator 130. The object locator 130 comprises a model applying module 131 for applying, for at least one frame of a video stream, a context-based object classifying model to a set of object location representations to obtain a context-adapted classification probability for each object location representation of the set. The object location representations of the set are derived from an object detection applied to the at least one frame. Each object location representation of the set defines a region of the at least one frame and each context-adapted classification probability represents a likelihood that the region of the at least one frame defined by the object location representation comprises an object. The context-based object classifying model is generated based on object location representations from previous frames of the video stream. The object locator 130 also comprises an object determining module 133 for determining, for each object location representation of at least a portion of the set, whether the region of the at least one frame defined by the object location representation comprises an object based on the context-adapted classification probability and a detection probability. The detection probability is derived from the object detection and represents a likelihood that the region of the at least one frame defined by the object location representation comprises an object.

In an embodiment, the object locator 130 also comprises a probability determining module 132 for determining, for each object location representations of at least the portion of the set, an updated probability based on the context-adapted classification probability and the detection probability. In this embodiment, the object determining module 133 is for determining, for each object location representation of at least the portion of the set, whether the region of the at least one frame defined by the object location representation comprises an object based on the updated probability.

A further aspect relates to a user device 1, see FIGS. 1 and 2, comprising an object locator according to the invention, such as described in connection with any of FIGS. 15 to 19. In an embodiment, the user device 1 also comprises, or is connected to, a camera 2 configured to record video and generate a video stream.

In an embodiment, the user device is selected from a group consisting of a computer, a laptop, a smart phone, a mobile phone, a tablet, a multimedia player, a set-top box, and a game console.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:
- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software can be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, network devices, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level. It should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 20:
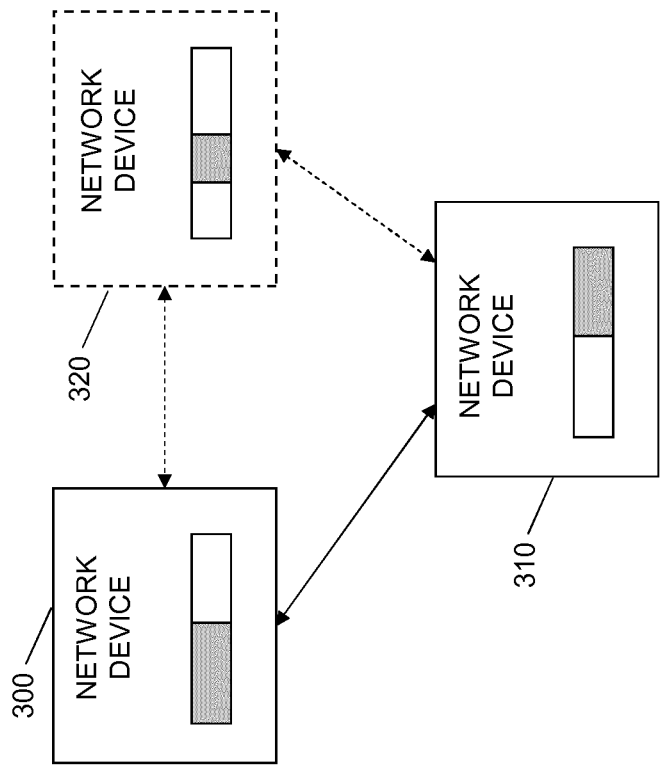
FIG. 20 schematically illustrates a distributed implementation among network devices.

FIG. 20 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Figure 21:
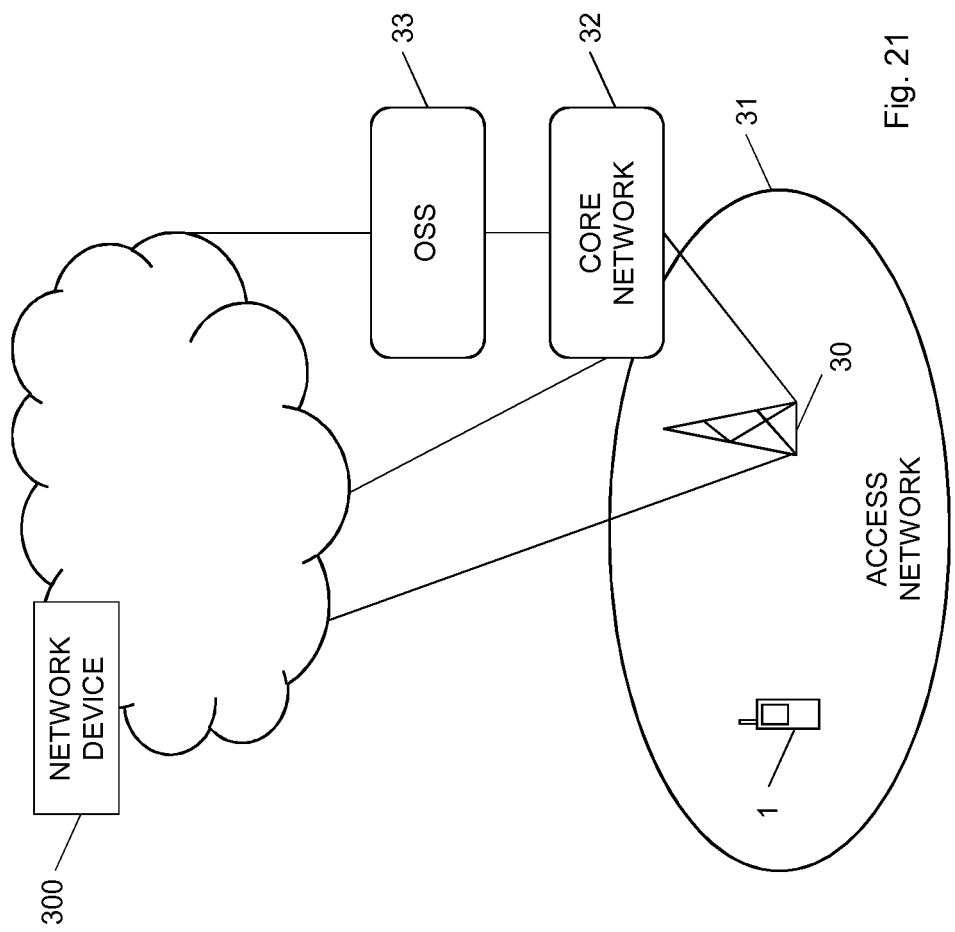
FIG. 21 is a schematic illustration of an example of a wireless communication system with one or more cloud-based network devices according to an embodiment.

FIG. 21 is a schematic diagram illustrating an example of a wireless communication system, including a radio access network (RAN) 31 and a core network 32 and optionally an operations and support system (OSS) 33 in cooperation with one or more cloud-based network devices 300. The figure also illustrates a user device 1, connected to the RAN 31 and capable of conducting wireless communication with a RAN node 30, such as a network node, a base station, node B (NB), evolved node B (eNB), next generation node B (gNB), etc.

The network device 300 illustrated as a cloud-based network device 300 in FIG. 21 may alternatively be implemented in connection with, such as at, the RAN node 30.

A further aspect of the embodiments relates to a network node 30 or network device 300 comprising an object locator according to the invention, such as described in connection with any of FIGS. 15 to 19.

As used herein, network node may refer to base stations, access points, network control nodes, such as network controllers, radio network controllers, base station controllers, access controllers, and the like. In particular, the term base station may encompass different types of radio base stations including standardized base station functions, such as Node Bs (NBs), or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 22 and 23.

Figure 22:
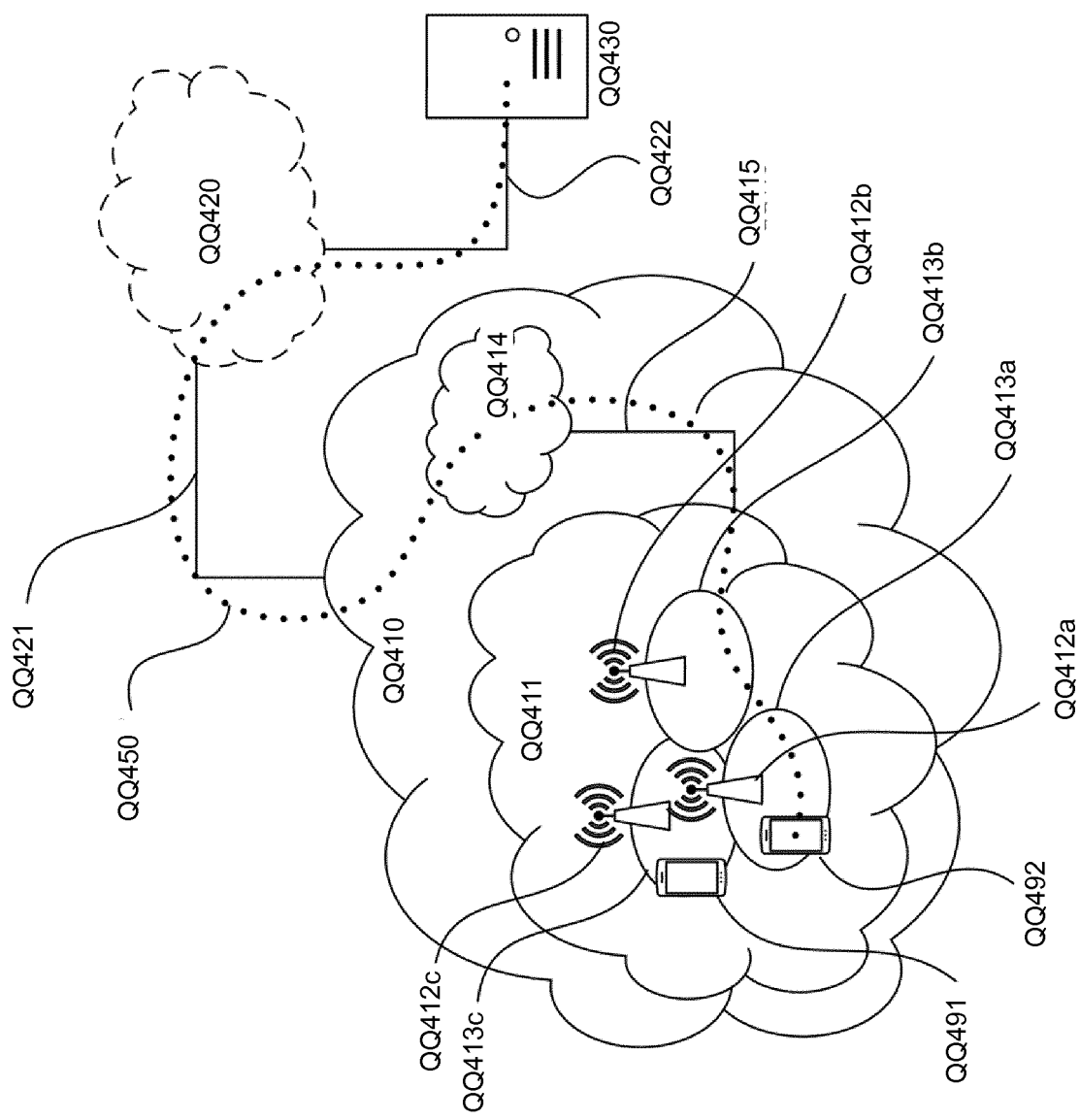
FIG. 22 is a schematic diagram illustrating an example of a telecommunication network connected via an intermediate network to a host computer in accordance with some embodiments.

FIG. 22 is a schematic diagram illustrating an example of a telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

FIG. 23 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 23) served by base station QQ520. Communication interface QQ526 may be configured to facilitate connection QQ560 to host computer QQ510. Connection QQ560 may be direct or it may pass through a core network (not shown in FIG. 23) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412a, QQ412b, QQ412c and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

Appendix A

1 Online Learning in Extreme Learning Machines (ELM)

Traditional ELM methods assume the availability of all the training data before the training process. But in some applications, it is not possible to have all the training data before training, and, hence, there is a need for a system that is capable of learning from data that arrives as and when new data is available. Online-Sequential Extreme Learning Machines (OS-ELM) is an extension of ELM that can learn from data one-by-one or chunk-by-chunk with fixed or varying chunk sizes. Here, the pseudo-inverse $H^\dagger$ is reformulated as $$H^\dagger = (H^T H)^{-1} H^T \quad (1)$$

if $H^T H$ is non-singular. Eq (1) is called the left-pseudo-inverse of H. The learning algorithm of OS-ELM consists of two phases: initialization phase and sequential learning phase. For data $\aleph = \{(x_i, t_i) | x_i \in R^n, t_i \in R^m, i=1, \ldots \}$ 1. Step 1) Initialization Phase: Initialize the learning with a small chunk of training data $\aleph_0 = \{(x_i, t_i)\}_{i=0}^{N_0}$
   (a) Assign hidden node parameters weights $w_i$ and bias $b_i$, $i=1, \ldots, N$.
   (b) Calculate the initial hidden layer output matrix $H_0$.

$$H_0 = \begin{bmatrix} g(w_1 \cdot x_1 + b_1) & \cdots & g(w_{\tilde{N}} \cdot x_1 + b_{\tilde{N}}) \\ \vdots & \vdots & \vdots \\ g(w_1 \cdot x_N + b_1) & \cdots & g(w_{\tilde{N}} \cdot x_{N_0} + b_{\tilde{N}}) \end{bmatrix}_{N_0 \times \tilde{N}} \quad (2)$$

(c) Calculate the initial output weight $\beta^{(0)} = P_0 H_0^T T_0$, where $P_0 = (H_0^T H_0)^{-1}$ and $T_0 = [t_1, \ldots, t_{N_0}]^T$
   (d) Set k=0.
2. Step 2) Learning Phase: For the (k+1)th chunk of data $$\aleph_{k+1} = \{(x_i, t_i)\}_{i=(\Sigma_{j=0}^k N_j)+1}^{\Sigma_{j=0}^{k+1} N_j} \quad (3)$$

where $\aleph_{(k+1)}$ denotes the number of observations in (k+1)th chunk.
   (a) Calculate the partial hidden layer output matrix $H_{k+1}$ $$H_{k+1} = \begin{bmatrix} g\left(w_1 \cdot x_{(\Sigma_{j=0}^k N_j)+1} + b_1\right) & \cdots & g\left(w_{\tilde{N}} \cdot x_{(\Sigma_{j=0}^k N_j)+1} + b_{\tilde{N}}\right) \\ \vdots & \vdots & \vdots \\ g\left(w_1 \cdot x_{(\Sigma_{j=0}^{k+1} N_j)} + b_1\right) & \cdots & g\left(w_{\tilde{N}} \cdot x_{(\Sigma_{j=0}^{k+1} N_j)} + b_{\tilde{N}}\right) \end{bmatrix}_{N_{k+1} \times \tilde{N}} \quad (4)$$

(b) Set $T_{k+1} = [t_{(\Sigma_{j=0}^k N_j)+1}, \ldots, t_{(\Sigma_{j=0}^{k+1} N_j)}]^T$.
   (c) Update the output weight $\beta^{(k+1)}$ $$\beta^{(k+1)} = \beta^{(k)} + P_{k+1} H_{k+1}^T (T_{k+1} - H_{k+1} \beta^{(k)}) \quad (5)$$

where, $$P_{(k+1)} = P_k - P_k H_{k+1}^T (I + H_{k+1} P_k H_{k+1}^T)^{-1} H_{k+1} P_k \quad (6)$$

(d) Set k=k+1.

In the initialization phase, an initial hidden layer matrix $H_0$ is filled. Based on this initial $H_0$, an initial output weight $\beta^{(0)}$ is calculated. This $\beta^{(0)}$ is then updated for each chunk of data that arrives.

2 System Model

Herein, a novel learning algorithm based on ELM is proposed. The proposed system is based on OS-ELM, also taking regularization into consideration.

2.1 Regularized Online ELM 2.1.1 Initialization Phase

For data $\aleph = \{(x_i, t_i) | x_i \in R^n, t_i \in R^m, i=1, \ldots \}$ $$H_0 = \begin{bmatrix} g(w_1 \cdot x_1 + b_1) & \cdots & g(w_{\tilde{N}} \cdot x_1 + b_{\tilde{N}}) \\ \vdots & \vdots & \vdots \\ g(w_1 \cdot x_N + b_1) & \cdots & g(w_{\tilde{N}} \cdot x_{N_0} + b_{\tilde{N}}) \end{bmatrix}_{N_0 \times \tilde{N}} \text{ and} \quad (7)$$

$$T = \begin{bmatrix} t_1^T \\ \vdots \\ t_{N_0}^T \end{bmatrix}_{N_0 \times m}$$

To minimize $\|H_0 \beta - T_0\|_2^2 + \|\beta\|_2^2$, solution $\beta^{(0)}$ is obtained by $$\beta^{(0)} = P_0^{-1} H_0^T T_0 \quad (8)$$

where, $$P_0 = H_0^T H + \lambda I \qquad (9)$$

2.1.2 Learning Phase

When new data with $N_1$ observation arrives, we have a training data of $\aleph_1 \{(x_i, t_i)\}_{i=N_0+1}^{N_0+N_1}$. The least square problem now changes to $$\left\| \begin{bmatrix} H_0 \\ H_1 \end{bmatrix} \beta - \begin{bmatrix} T_0 \\ T_1 \end{bmatrix} \right\|_2^2 + \lambda \|\beta\|_2^2$$

Solving for $\beta$, we get $$\beta^{(1)} = \left[ \begin{bmatrix} H_0 \\ H_1 \end{bmatrix}^T \begin{bmatrix} H_0 \\ H_1 \end{bmatrix} + \lambda I \right]^{-1} \begin{bmatrix} H_0 \\ H_1 \end{bmatrix}^T \begin{bmatrix} T_0 \\ T_1 \end{bmatrix} \qquad (10)$$

Here, $$P_1 = \begin{bmatrix} H_0 \\ H_1 \end{bmatrix}^T \begin{bmatrix} H_0 \\ H_1 \end{bmatrix} + \lambda I \qquad (11)$$

$$P_1 = H_0^T H_0 + H_1^T H_1 + \lambda I \qquad (12)$$

$$P_1 = P_0 + H_1^T H_1 \qquad (13)$$

$$\begin{bmatrix} H_0 \\ H_1 \end{bmatrix}^T \begin{bmatrix} T_0 \\ T_1 \end{bmatrix} = H_0^T T_0 + H_1^T T_1 \qquad (14)$$

$$= P_0 P_0^{-1} H_0^T T_0 + H_1^T T_1 \qquad (15)$$

$$= P_0 \beta^{(0)} + H_1^T T_1 \qquad (16)$$

$$= (P_1 - H_1^T H_1) \beta^{(0)} + H_1^T T_1 \qquad (17)$$

$$= P_1 \beta^{(0)} - H_1^T H_1 \beta^{(0)} + H_1^T T_1 \qquad (18)$$

Therefore, $$\beta^{(1)} = P_1^{-1}(P_1 \beta^{(0)} - H_1^T H_1 \beta^{(0)} + H_1^T T_1) = \beta^{(0)} + P_1^{-1} H_1^T H_1 \beta^{(0)} + P_1^{-1} H_1^T T_1) \qquad (19)$$

$$\beta^{(1)} = \beta^{(0)} + P_1^{-1} H_1^T (T_1 - H_1 \beta^{(0)}) \qquad (20)$$

2.1.3 Algorithm

1. Step 1) Initialization Phase: Initialize the learning with a small chunk of training data $\aleph_0 = \{(x_i, t_i)\}_{i=0}^{N_0}$
  (a) Assign hidden node parameters weights $w_i$ and bias $b_i$, $i=1, \ldots, N$.
  (b) Calculate the initial hidden layer output matrix $H_0$.

$$H_0 = \begin{bmatrix} g(w_1 \cdot x_1 + b_1) & \cdots & g(w_{\tilde{N}} \cdot x_1 + b_{\tilde{N}}) \\ \vdots & \vdots & \vdots \\ g(w_1 \cdot x_N + b_1) & \cdots & g(w_{\tilde{N}} \cdot x_{N_0} + b_{\tilde{N}}) \end{bmatrix}_{N_0 \times \tilde{N}} \qquad (21)$$

(c) Calculate the initial output weight $\beta(0) = P_0 H_0^T T_0$, where $P_0 = (H_0^T H_0 + \lambda I)^{-1}$ and $T_0 = [t_1, \ldots, t_{N_0}]^T$
  (d) Set k=0.
2. Step 2) Learning Phase: For the (k+1)th chunk of data $$\aleph_{k+1} = \{(x_i, t_i)\}_{i=(\Sigma_{j=0}^k N_j)+1}^{\Sigma_{j=0}^{k+1} N_j} \qquad (22)$$

where $\aleph_{(k+1)}$ denotes the number of observations in (k+1)th chunk.

(a) Calculate the partial hidden layer output matrix $H_{k+1}$ $$H_{k+1} = \begin{bmatrix} g\left(w_1 \cdot x_{(\Sigma_{j=0}^k N_j)+1} + b_1\right) & \cdots & g\left(w_{\tilde{N}} \cdot x_{(\Sigma_{j=0}^k N_j)+1} + b_{\tilde{N}}\right) \\ \vdots & \vdots & \vdots \\ g\left(w_1 \cdot x_{(\Sigma_{j=0}^{k+1} N_j)} + b_1\right) & \cdots & g\left(w_{\tilde{N}} \cdot x_{(\Sigma_{j=0}^{k+1} N_j)} + b_{\tilde{N}}\right) \end{bmatrix}_{N_{k+1} \times \tilde{N}} \qquad (23)$$

(b) Set $T_{k+1} = [t_{(\Sigma_{j=0}^k N_j)+1}, \ldots, T_{(\Sigma_{j=0}^{k+1} N_j)}]^T$.
  (c) Update the output weight $\beta^{(k+1)}$ $$\beta^{(k+1)} = \beta(k) + P_{k+1} H_{k+1}^T (T_{k+1} - H_{k+1} \beta_{(k)}) \qquad (24)$$

$$P_{(k+1)} = P_k - P_k H_{k+1}^T (I + H_{k+1} P_k H_{k+1}^T)^{-1} H_{k+1} P_k \qquad (25)$$

(d) Set k=k+1.

3 System Model

3.1 Data Sets

For the experiments, MNIST dataset and football sequences were used. MNIST is an database of handwritten digits, from 0-9 (10 classes). MNIST database has 60,000 training samples and 10,000 testing samples. It is available at http://yann.lecun.com/exdb/mnist/. Football dataset consists of football game sequences that have 2 classes: player and background.

For football data, there are equal number of positive and negative samples for each video frame, for easy implementation. In case of football data, region labelled as a player is a positive sample and all other regions are negative samples.

3.2 Pre-Initialization

For initialization phase, an initial block of training data is used to obtain an initial model, which is updated as new data arrives. First, the size of this initial block is taken as $N_0$=500 for the final experiments. For data arriving in real-time, the positive and negative samples are buffered to reach the pre-determined number of positive and negative samples.

3.3 Training

3.3.1 Block Size

A block size of $B_0$=500 samples is chosen for football data and MNIST. Similar to pre-initialization, for data arriving in real-time, the positive and negative samples are buffered to reach the pre-determined number of positive and negative samples. Note that both pre-initialization and block size are the same value, but are explained in separate sections to differentiate the initial model based on pre-initialized data and updated model based on blocks of data after the initial model.

3.3.2 Activation Function

Although different activation can be experimented, in this Appendix sigmoidal activation is used in all the experiments.

3.3.3 Hidden Nodes

The number of hidden nodes is set as N=2000 in cases, where the number of hidden nodes N is not specified. For different values of N, experiments were conducted and a value of N=2000 was chosen as the optimum value.

4 Application

In this section, an application of the Regularized OS-ELM is disclosed. Regularized OS-ELM was used as an adaptive post-processing algorithm for a Faster R-CNN system. The block diagram of this implementation is shown in FIG. 14.

Faster R-CNN system gives the ouput in the following format. The first four columns represent the left-top and right bottom coordinates of the bounding box $B_k$. The bounding box is one of the proposal regions, and the following probability columns represent the detection probability of that regional proposal, $P_k$ belonging to a particular class. Therefore, for a $n^{th}$ video frame, we have a number of region proposals with the corresponding detection probability of it belonging to a particular class. In this application, football data was used. Therefore, the detection probabilities associated with a region denote the likelihood of having an object in that particular region.

To train the regularized OS-ELM, the output of the R-CNN system was used. The region proposals, $P_k$ were sorted in descending order such the region proposal with higher detection probabilities are on the top of the set $\{B_k, P_k\}$. All region proposals above a high probability threshold, say $\theta_h$, were chosen as positive samples 14. Let the number of positive samples for that nth frame be M. To obtain negative samples, $B_-$, M number of negative samples are chosen from the bottom of the sorted set condition to it being less than a very low threshold, $\theta_l$ say 0.1. Additional to probability threshold for the negative samples, the size of the regions was also checked. Since region proposals can be very large, choosing such samples as negative samples was not favourable. To overcome this, a restriction based on the average size of all the positive samples was imposed to select the negative sample. Once the positive and negative samples, $\{B_+, B_-\}$ were available either all at once or in a buffer, they were scaled to a pre-determined resolution. Now, the post-processing algorithm, that is, the regularized OS-ELM was implemented with this data, $\{B_+, B_-\}$, and as new data arrived, the context-based object classifying model was updated online. This context-based object classifying model was applied on the whole set of region proposals $B_k$ in the current frame to give the set of context-adapted classification probabilities $C_k$ as the output for the regions. The decision to accept or reject the regions $B_k$ was dependant both on the detection probability produced by Faster R-CNN, $P_h$ and the context-adapted classification probabilities produced by regularized OS-ELM, $C_k$. This thresholding was achieved by using a weighting factor, $\lambda$. For region proposal to be accepted as an object, it had to satisfy (35). Otherwise, the region proposal was rejected.

$$(1-\lambda)P_k + \lambda C_k \geq \theta \quad (26)$$

Since, the regularized OS-ELM was fast, its application as a post-processing algorithm was at minimal increase of computational complexity.

Algorithm: Regularized OS-ELM as a post-processing algorithm to Faster R-CNN

Input: $B_k$, $P_k$, $\theta_h$, $\theta_l$ for the $n_{th}$ video frame
Output: Set of detected objects in the $n_{th}$ video frame
Apply offline trained Faster R-CNN boject detector→$\{B_k, P_k\}$;
Sort $P_k$ and rearrange $\{B_k, P_k\}$;
if $P_k \geq \theta_h$ then $B_+$;
M=M+1;
From end of sorted array, select M such that if $P_k \leq \theta_l$ then $B_-$;
Scale $\{B_+, B_-\}$ to a pre-determined resolution.;
Evaluate context-based classifying model $\Omega$;
Apply context-based classifying model $\Omega$ on the whole set of region proposals $B_k \rightarrow C_k$;

Threshold proposal regions to accept or reject candidate objects and create set of detected objects; if $(1-\lambda)P_k + \lambda C_k \geq \theta$ then $B_k$ contains an object;
else
$B_k$ does not contain an object.

The invention claimed is:

1. An object locator, comprising:
processing circuitry; and
memory comprising instructions executable by the processing circuitry whereby the object locator is operative to:
apply, for at least one frame of a video stream, a context-based object classifying model to a set of object location representations, derived from an object detection applied to the at least one frame, to obtain a context-adapted classification probability for each object location representation of the set; wherein each object location representation of the set defines a region of the at least one frame; wherein each context-adapted classification probability represents a likelihood that the region of the at least one frame defined by the object location representation comprises an object; wherein the context-based object classifying model is generated based on object location representations from previous frames of the video stream; and
determine, for each object location representation of at least a portion of the set, whether the region of the at least one frame defined by the object location representation comprises an object based on the context-adapted classification probability and a detection probability;
wherein the detection probability is derived from the object detection and represents a likelihood that the region of the at least one frame defined by the object location representation comprises an object.

2. The object locator of claim 1, wherein the instructions are such that the object locator is operative to:
define a positive set comprising the object location representations of the set having an associated detection probability exceeding a threshold value; and
update the context-based object classifying model based on the positive set.

3. The object locator of claim 2, wherein the instructions are such that the object locator is operative to:
extract, at run-time and into the positive set, the object location representations of the set having an associated detection probability exceeding the threshold value; and
update, at run-time, the context-based object classifying model based on the positive set.

4. The object locator of claim 2, wherein the instructions are such that the object locator is operative to:
define a negative set comprising M object location representations of the set having lowest associated detection probability; wherein M represents a number of object location representations in the positive set; and
update the context-based object classifying model based on the positive set and the negative set.

5. The object locator of claim 4, wherein the instructions are such that the object locator is operative to:
determine an average size of the regions of the at least one frame defined by the object location representations in the positive set; and select, for the negative set, the M object location representations of the set:
  having lowest associated detection probability; and
  defining a region of the at least one frame having a size that does not deviate from the average size with more than a threshold value.

6. The object locator of claim 4, wherein the instructions are such that the object locator is operative to scale the object location representations in the positive set and the object location representations in the negative set to a common resolution.

7. The object locator of claim 2, wherein the instructions are such that the object locator is operative to update the context-based object classifying model:
  for each Nth frame of the video stream, wherein N is a predefined number; or
  at a frame of the video stream once the positive set comprises at least a predefined number of object location representations.

8. The object locator of claim 1, wherein the instructions are such that the object locator is operative to sort the object location representations of the set based on the detection probability in an order of likelihoods that the region of the at least one frame defined by the object location representation comprises an object.

9. The object locator of claim 1, wherein the instructions are such that the object locator is operative to:
  determine, for each object location representation of at least a portion of the set, an updated probability based on the context-adapted classification probability and the detection probability; and
  determine, for each object location representation of at least a portion of the set, whether the region of the at least one frame defined by the object location representation comprises an object based on the updated probability.

10. The object locator of claim 9, wherein the instructions are such that the object locator is operative to determine, for each object location representation of at least the portion of the set, the updated probability based on a weighted combination of the context-adapted classification probability and the detection probability.

11. The object locator of claim 10, wherein the instructions are such that the object locator is operative to determine, for each object location representation of at least the portion of the set, the updated probability based on $(1-\lambda) \times P_k + \lambda \times C_k$; wherein $C_k$ represents the context-adapted classification probability, $P_k$ represents the detection probability, and $\lambda$ is a weighting factor.

12. The object locator of claim 11, wherein the instructions are such that the object locator is operative to determine, for each object location representation of at least the portion of the set, that the region of the at least one frame defined by the object location representation comprises an object if $(1-\lambda) \times P_k + \lambda \times C_k \geq T_{OD}$, and otherwise determine that the region of the at least one frame defined by the object location representation does not comprise any object, wherein $T_{OD}$ is a threshold value.

13. The object locator of claim 11, wherein the instructions are such that the object locator is operative to adapt a value of the weighting factor $\lambda$ based on an accuracy of the context-based classification model.

14. The object locator of claim 9, wherein the instructions are such that the object locator is operative to:
  determine, for each object location representation of the set, the updated probability based on the context-adapted classification probability and the detection probability; and
  determine, for each object location representation of the set, whether the region of the at least one frame defined by the object location representation comprises an object based on the updated probability.

15. The object locator of claim 9, wherein the instructions are such that the object locator is operative to:
  identify object location representations of the set having a detection probability within a probability interval; and
  determine, for each identified object location representation, whether the region of the at least one frame defined by the identified object location representation comprises an object based on the updated probability.

16. The object locator of claim 1, wherein the instructions are such that the object locator is operative to apply the object detection to the at least one frame to obtain the set of object location representations and the associated detection probability.

17. The object locator of claim 1, wherein the instructions are such that the object locator is operative to receive the set of object location representations and the associated detection probability from an offline-trained object detector.

18. A user device, comprising:
  an object locator, the object locator comprising:
    processing circuitry; and
    memory comprising instructions executable by the processing circuitry whereby the object locator is operative to:
      apply, for at least one frame of a video stream, a context-based object classifying model to a set of object location representations, derived from an object detection applied to the at least one frame, to obtain a context-adapted classification probability for each object location representation of the set; wherein each object location representation of the set defines a region of the at least one frame; wherein each context-adapted classification probability represents a likelihood that the region of the at least one frame defined by the object location representation comprises an object; wherein the context-based object classifying model is generated based on object location representations from previous frames of the video stream; and
      determine, for each object location representation of at least a portion of the set, whether the region of the at least one frame defined by the object location representation comprises an object based on the context-adapted classification probability and a detection probability; wherein the detection probability is derived from the object detection and represents a likelihood that the region of the at least one frame defined by the object location representation comprises an object.

19. The user device of claim 18, further comprising a camera configured to record video and generate a video stream.

20. A network node, comprising:
  an object locator, the object locator comprising:
    processing circuitry; and
    memory comprising instructions executable by the processing circuitry whereby the object locator is operative to:

apply, for at least one frame of a video stream, a context-based object classifying model to a set of object location representations, derived from an object detection applied to the at least one frame, to obtain a context-adapted classification probability for each object location representation of the set; wherein each object location representation of the set defines a region of the at least one frame; wherein each context-adapted classification probability represents a likelihood that the region of the at least one frame defined by the object location representation comprises an object; wherein the context-based object classifying model is generated based on object location representations from previous frames of the video stream; and determine, for each object location representation of at least a portion of the set, whether the region of the at least one frame defined by the object location representation comprises an object based on the context-adapted classification probability and a detection probability; wherein the detection probability is derived from the object detection and represents a likelihood that the region of the at least one frame defined by the object location representation comprises an object.

21. A method of object locating, the method comprising, for at least one frame of a video stream:

applying a context-based object classifying model to a set of object location representations, derived from an object detection applied to the at least one frame, to obtain a context-adapted classification probability for each object location representation of the set; wherein each object location representation of the set defines a region of the at least one frame; wherein each context-adapted classification probability represents a likelihood that the region of the at least one frame defined by the object location representation comprises an object; wherein the context-based object classifying model is generated based on object location representations from previous frames of the video stream; and determining, for each object location representation of at least a portion of the set, whether the region of the at least one frame defined by the object location representation comprises an object based on the context-adapted classification probability and a detection probability; wherein the detection probability is derived from the object detection and represents a likelihood that the region of the at least one frame defined by the object location representation comprises an object.

* * * * *